Aug. 17, 1954

M. DEN HERTOG

IDENTIFICATION CIRCUIT FOR AUTOMATIC OR SEMIAUTOMATIC TELEPHONE SYSTEMS 2,686,840

Filed Nov. 25, 1950

7 Sheets-Sheet 1

INVENTOR
MARTINUS DEN HERTOG
BY Robert Harding Jr.
ATTORNEY

Aug. 17, 1954

M. DEN HERTOG

IDENTIFICATION CIRCUIT FOR AUTOMATIC OR SEMIAUTOMATIC TELEPHONE SYSTEMS 2,686,840

Filed Nov. 25, 1950

7 Sheets-Sheet 2

INVENTOR
MARTINUS DEN HERTOG
BY
[signature]
ATTORNEY

Aug. 17, 1954 M. DEN HERTOG 2,686,840

IDENTIFICATION CIRCUIT FOR AUTOMATIC OR SEMIAUTOMATIC TELEPHONE SYSTEMS

Filed Nov. 25, 1950

7 Sheets-Sheet 3

INVENTOR
MARTINUS DEN HERTOG
BY
Robert Harding Jr.
ATTORNEY

INVENTOR
MARTINUS DEN HERTOG
BY
Robert Harding Jr.
ATTORNEY

Aug. 17, 1954

M. DEN HERTOG

IDENTIFICATION CIRCUIT FOR AUTOMATIC OR SEMIAUTOMATIC TELEPHONE SYSTEMS 2,686,840

Filed Nov. 25, 1950

7 Sheets-Sheet 5

INVENTOR
MARTINUS DEN HERTOG
BY
Robert Harding Jr.
ATTORNEY

Aug. 17, 1954

M. DEN HERTOG

IDENTIFICATION CIRCUIT FOR AUTOMATIC OR SEMIAUTOMATIC TELEPHONE SYSTEMS 2,686,840

Filed Nov. 25, 1950

7 Sheets-Sheet 6

INVENTOR
MARTINUS DEN HERTOG

BY Robert Harding, Jr.
ATTORNEY

INVENTOR
MARTINUS DEN HERTOG
BY
Robert Harding Jr.
ATTORNEY

Patented Aug. 17, 1954

2,686,840

UNITED STATES PATENT OFFICE 2,686,840

IDENTIFICATION CIRCUIT FOR AUTOMATIC OR SEMIAUTOMATIC TELEPHONE SYSTEMS

Martinus den Hertog, Antwerp, Belgium, assignor to International Standard Electric Corporation, New York, N. Y., a corporation of Delaware Application November 25, 1950, Serial No. 197,623

18 Claims. (Cl. 179—18)

The present invention relates to an automatic or semi-automatic telephone system or similar system for establishing connections and more particularly to an identification circuit arrangement therefor, in which the identification of a calling line may be effected by connecting a characteristic potential to one of the conductors of the line circuit to be identified, which potential is hunted for under the control of one of a plurality of idenfication circuits, being both common to all lines to be identified and to all circuits from which the identification may be requested. Similar identification circuit arrangements have already been applied in practice but in the known arrangements use was made of alternating current potentials in which separate direct current circuits were utilized for putting the identification into operation.

The object of the invention is to provide an improvement of these well-known circuit arrangements in which a reliable operation is attained with a simplified equipment.

In accordance with the invention the said potential is a single direct current potential of predetermined value, which in series with a resistance, is connected to said conductor via a physical circuit from the point in the established connection from which identification is requested.

A system which is somewhat similar to the system according to the present invention has been described in the patent to Gerald Deakin, No. 2,376,346, issued May 22, 1945, in which identification of a calling line may also take place with the aid of a characteristic direct current potential via a physical circuit from the point where identification is requested to a conductor of the line circuit to be identified.

In accordance with the circuit arrangement described in the said patent it is, however, necessary to allot a potential of different value to each point from which identification can be requested, so that one is limited in the number of places from which identification can be requested.

According to another feature of the invention, the said direct current potential (either positive or negative) and the resistance connected in series therewith, have such values, that the resulting voltage on said conductor cannot operate an equipment connected thereto which is responsive to other signals, while on the other hand the identification equipment responds exclusively to this resulting voltage because the said equipment responds solely to a voltage either of predetermined sign or of predetermined value. Furthermore, this characteristic direct current potential may also operate a starting circuit by closing a circuit via a rectifier, the potential on the conductor being higher than that connected in the starting circuit to said rectifier, which starting circuit thereupon hunts for and seizes an idle of said common identification circuits and maintains the circuit responsive during the time that it hunts for the marked conductor of the calling line.

In accordance with the present invention a starting circuit may be provided in common to each group of circuits (e. g. subscriber's line circuits with corresponding group or groups of line finders, input circuits of junctions) for which a group of identification finders is provided in common and wherein a selector, associated with the identification circuits, selects and seizes a free identification finder in that group, to which the line to be hunted is connected. During the selecting operation of the selector, a characteristic potential is connected to the test conductor of all free finders in the wanted group, wherein said potential is connected only from the identification circuit to the wanted group. This potential is supplied thereto through the corresponding starting circuit which has seized the identification circuit.

After the hunting of the conductor by the identification circuit, a circuit may be closed from the latter to said conductor via the winding of a relay to ground, whereby on the one hand the potential on said conductor is so lowered that the starting circuit ceases to function, because the potential on the conductor is reduced to a value at which the rectifier is no longer conductive, and on the other hand said relay operates and holds the identification circuit under the control of the direct current potential.

In the above mentioned patent, the resistance provided in some of the circuits, from which identification is requested, serves solely as a protecting resistance and not for creating a lowered potential on said conductor in the manner described in the preceding paragraph. In the above-mentioned patent the reduction of potential is not utilized to make the starting circuit inoperative, but according to said patent the starting circuit remains occupied for a predetermined line to be identified and until the entire identification thereof is terminated. Moreover, it becomes impossible thereby simultaneously to identify two different lines in a same group of lines.

In accordance with a further feature of this invention, after the identification circuit has hunted for a conductor, a physical circuit is then established over said conductor between this identification circuit and the point from which the identification is requested. This physical circuit may be used for setting a by-path under the control of the identification circuit, if necessary, via a plurality of conductors from the identification circuit to said point. Via said conductor and from the identification circuit, a characteristic potential for this circuit is connected to the circuit requesting the identification, which potential characterises the last mentioned circuit for setting the by-path.

In accordance with the invention a finder switch may be inserted in this by-path, this switch either being associated with each identification circuit or with each of said points from which identification can be requested, wherein the by-path is set by extending the physical circuit via a wiper and arc contact of said finder back to the identification circuit under consideration at the moment the finder reaches the wanted position under the control of the identification circuit.

This invention differs further from that disclosed in the above-mentioned patent in that in this application the physical circuit is admittedly used for setting a by-path, but this is not effected under the control of the common identification circuit but rather individually for each of the circuits from which identification can be requested, and that consequently the physical circuit is not extended through this last mentioned circuit to a common identification circuit.

After the by-path has been established the physical circuit between the identification circuit and the identification conductor of the calling line may be opened and a circuit for holding the identification circuit may be established directly from the circuit from which the identification is requested to the identification circuit, via one of the conductors of said by-path.

The finder may be associated with each identification circuit in which the position of this finder gives an indication to the identification circuit about the nature of the point from which the identification has been requested.

The nature of the point from which identification has been requested may, according to the invention, furthermore be signalled to the identification circuit, via one or more wipers of the said finder switch, from this point after setting the by-path.

According to the nature of the point from which identification is requested, the number of the calling line may be signalled over the by-path in different ways, e. g. for local calls by means of direct current impulses and for distant calls by means of voice frequency impulses.

Depending on the nature of the point from which identification is requested, the number of transmitted digits may be different, e. g. for calls in the local network, the digits of the subscriber's number only, and for calls to other networks these same digits preceded by the digital prefixes of this network.

Finally, between the originating exchange and the point from which the identification is requested, one or more junctions may be inserted in the built up connection, this identification being started because the marking potential is applied to one of the conductors of the incoming end of the junction circuit and makes an identification circuit operative, which, via another junction, establishes a by-path to the preceding exchange in the connection over which by-path the number of the calling line is transmitted from the originating exchange in the form of voice frequency impulses.

In accordance with the invention, the switch associated with said identification circuit which hunts for the point from which the identification is requested may operate the identification circuit in a different manner, according to the nature of the point, e. g. because the voice frequency impulses are converted into direct current impulses, if the identification is requested locally, or, in case of tandem connection, these voice frequency impulses are transmitted unaltered via a subsequent by-path.

The invention will be described with reference to the accompanying drawings which schematically show this invention while omitting those parts of the system which are not essential for a good understanding of the invention.

Figures 4, 8:
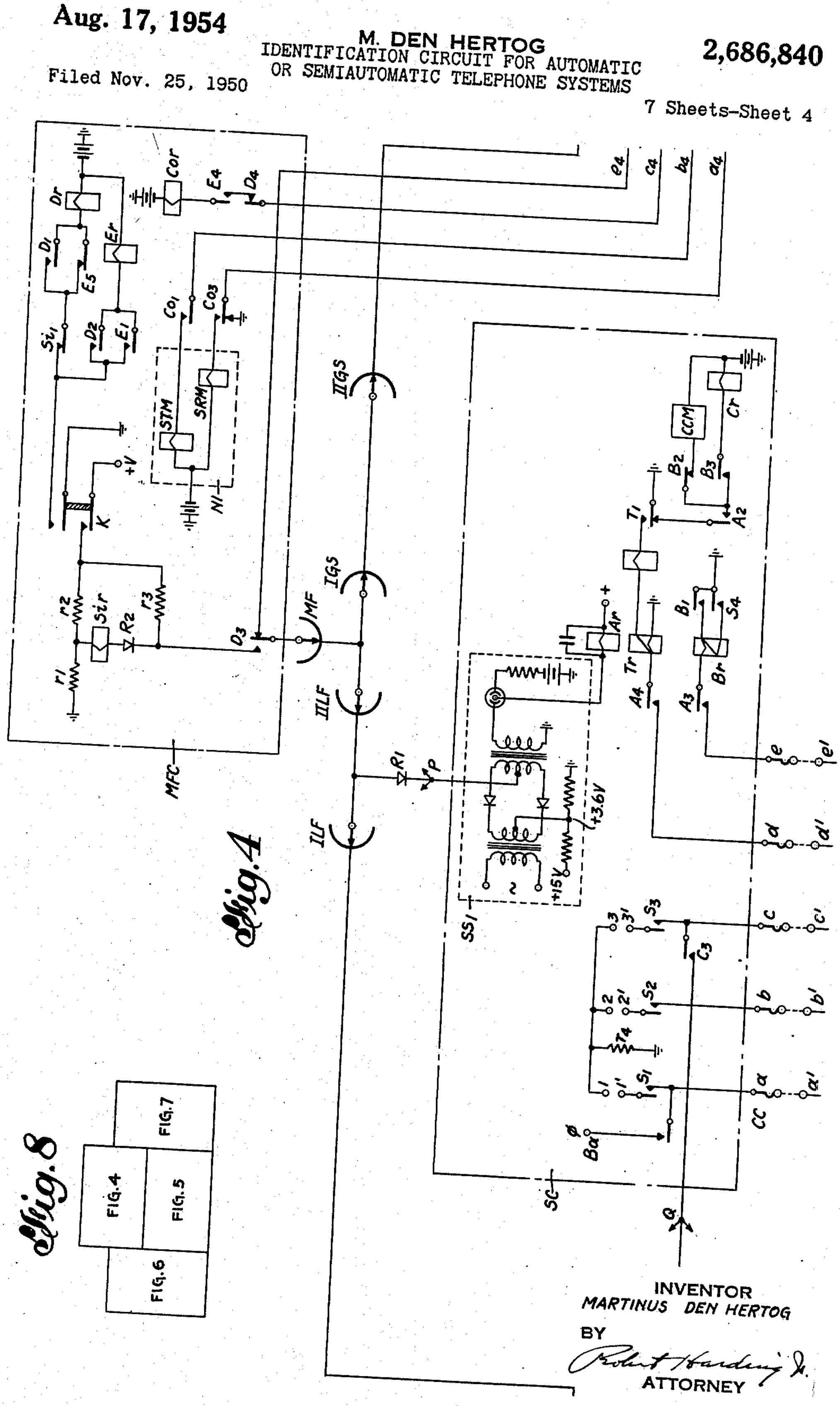

Figs. 4, 5, 6 and 7, which should be read in combination, as shown in Fig. 8, schematically show simplified circuits related to an embodiment of the invention.

In more detail, Fig. 4 represents a master false call circuit from which identification can be requested, together with a cord circuit for a connection with which said master false call circuit has become associated, as well as a starting circuit permanently associated with line finder circuits.

Figure 5:
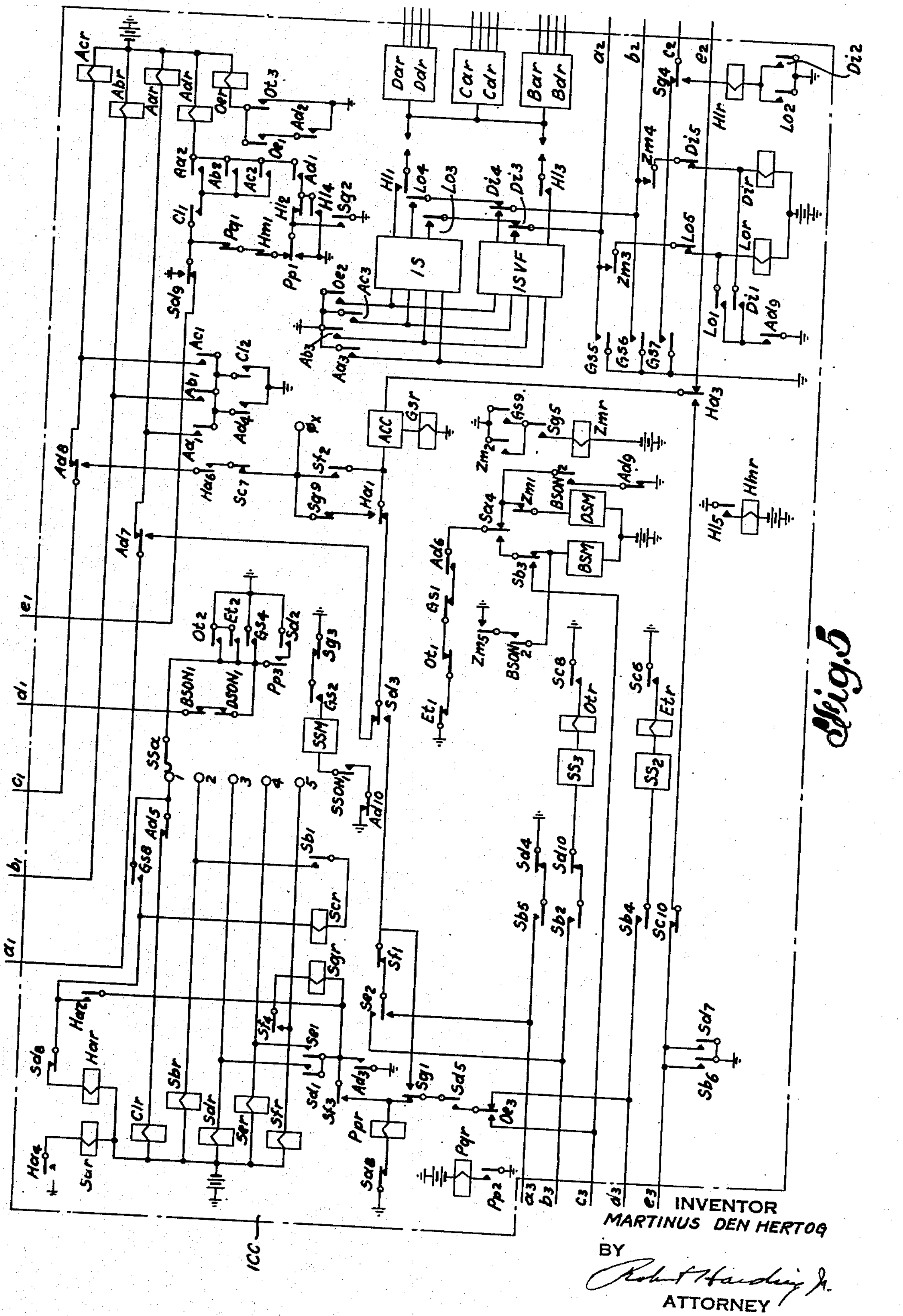

Fig. 5 schematically represents an identification common circuit which can be seized by the starting circuit.

Figure 6:
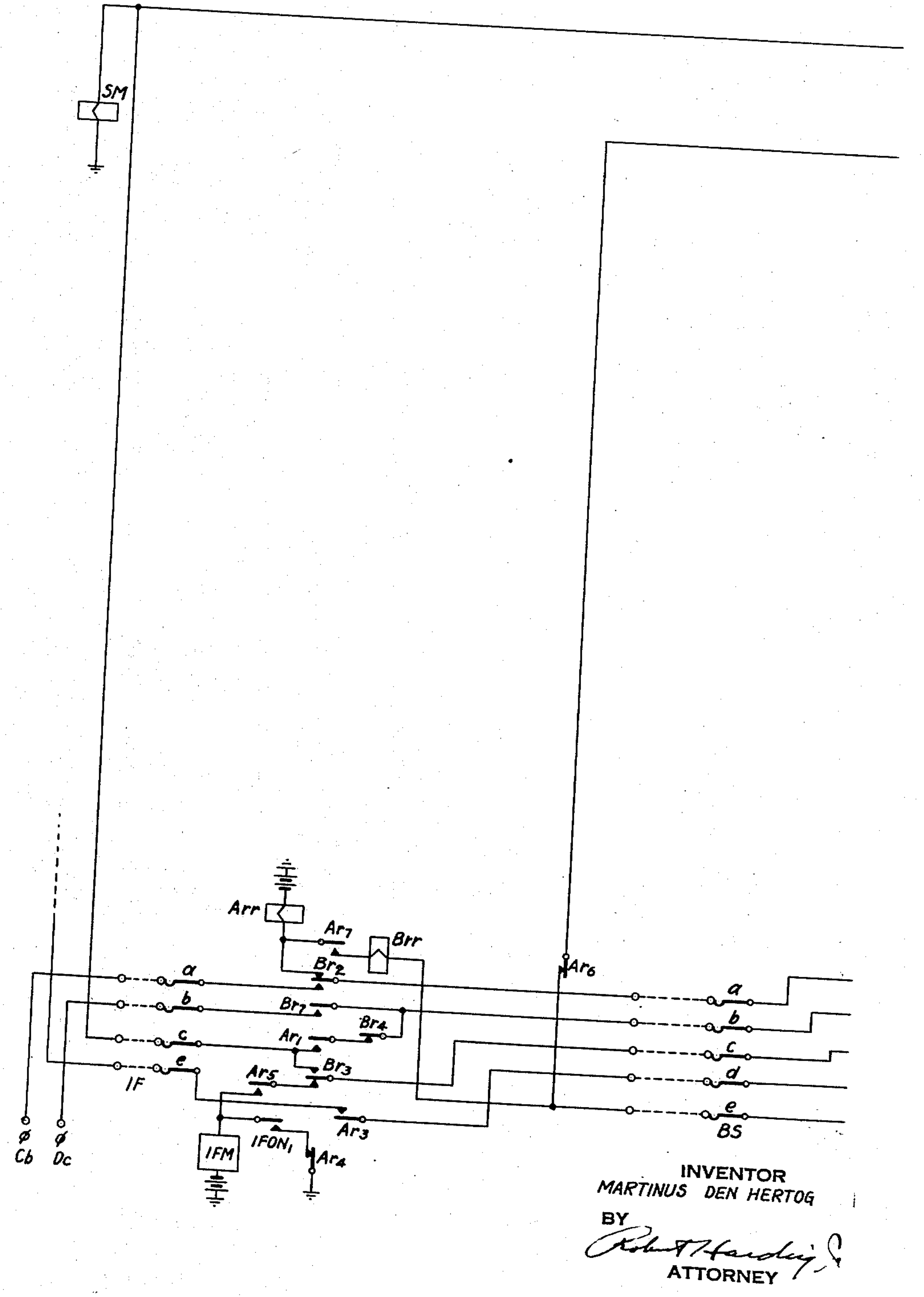

Fig. 6 schematically represents an identification finder circuit which can be selected from the identification common circuit.

Figure 7:
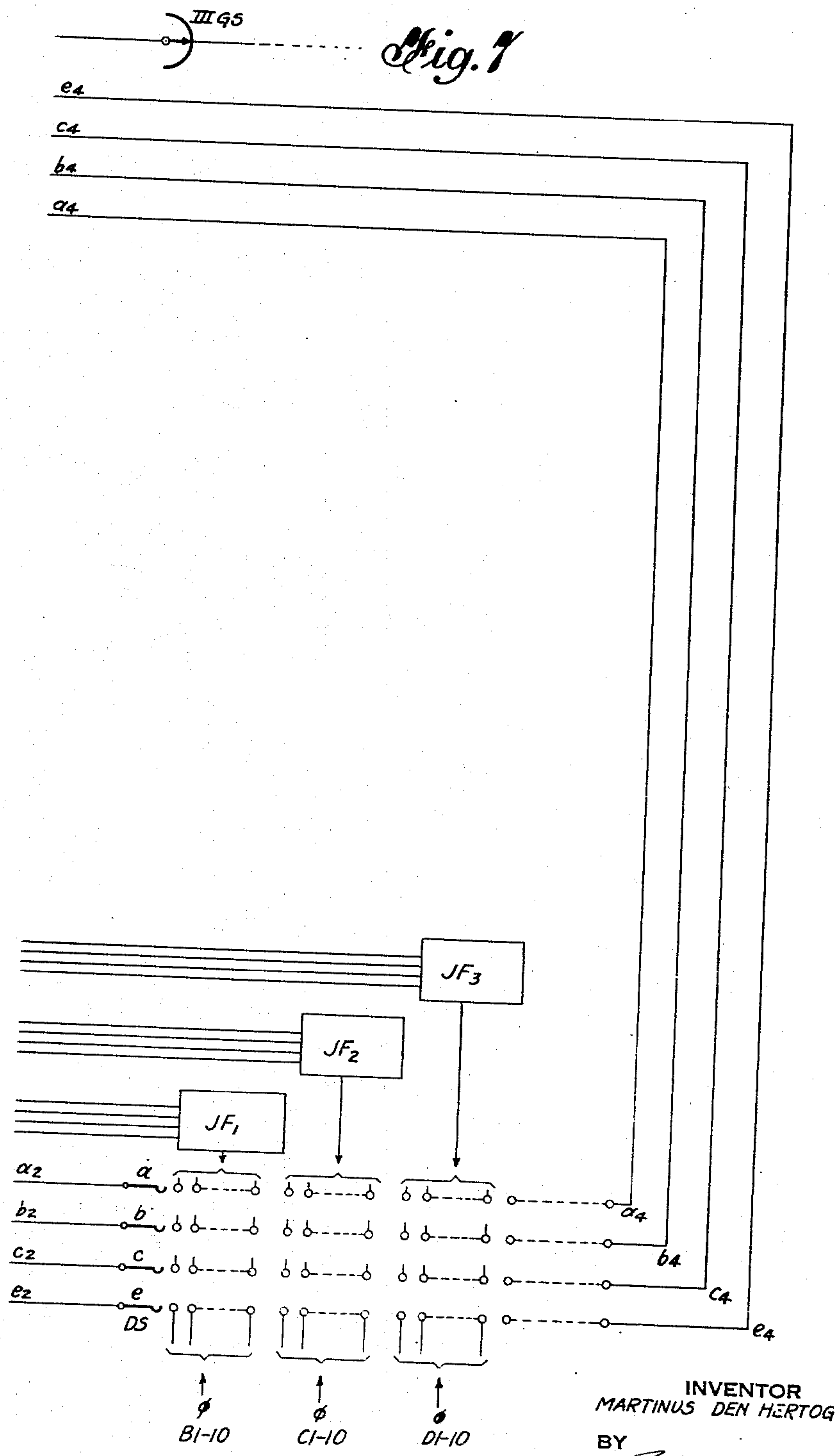

Fig. 7 schematically represents a finder which is used for setting a by-path to the circuit which requests an identification and which is also used for other purposes which will become apparent from the description.

The various operations and advantages of the system will be described separately.

*Identification of the calling line by a direct current potential on the metering wire*

Figure 1:
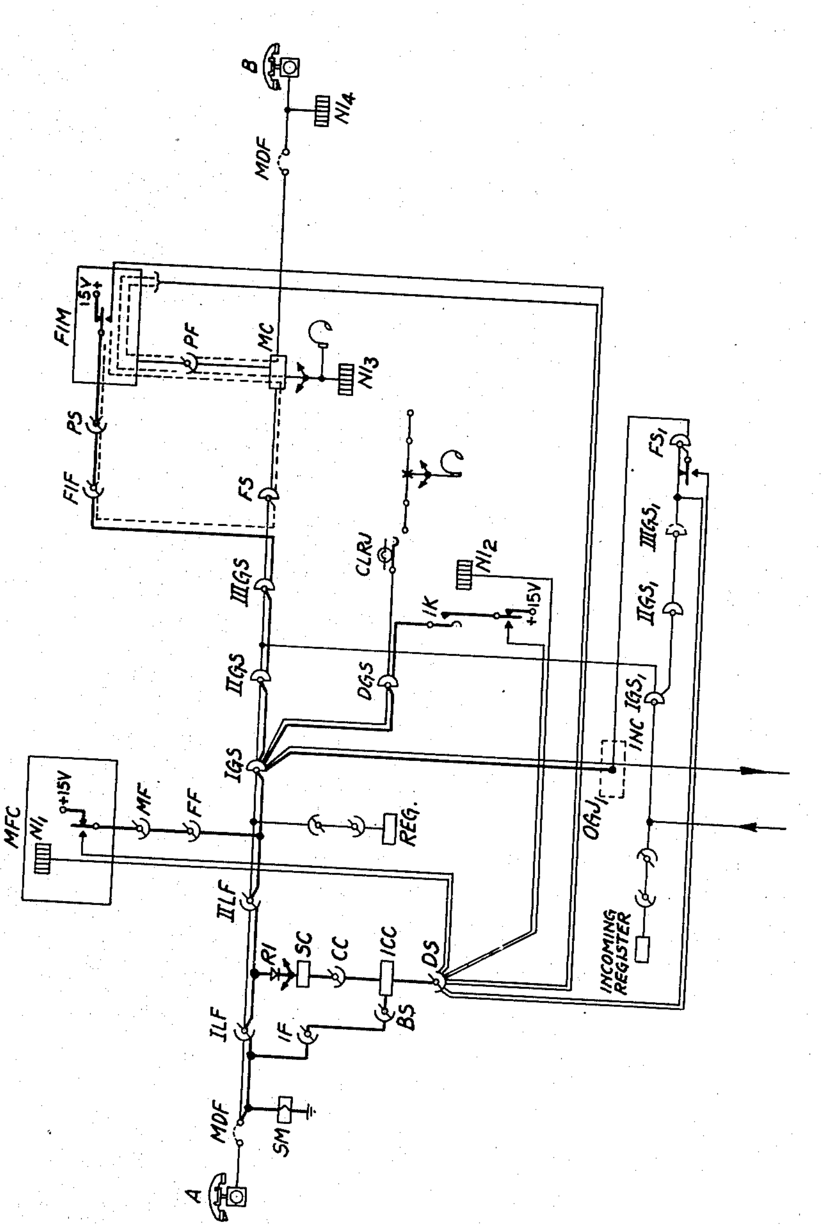
Fig. 1 shows a junction diagram of an exchange in which identification in accordance with the invention is applied.

In Fig. 1 a local connection, e. g. between the subscribers A and B is built up via the first and second linefinders I.LF and II.LF, the group selectors I.GS, II.GS and III.GS and a final selector FS.

The circuit with which II.LF and I.GS are associated will be called the "cord circuit."

A call to a local operator, e. g. for rapid traffic, is, according to Fig. 1, established via I.LF, II.LF, the first group selector I.GS and a special service selector D.GS, to a junction for rapid traffic CLRJ.

A connection to a distant exchange, e. g. to subscriber D thereof (Fig. 2) is established from subscriber A (Fig. 1) via I.LF, II.LF, I.GS, the outgoing end $OGJ_1$ of a junction circuit and via the two-wire junction to the distant exchange (Fig. 2) and subsequently via the incoming end of the junction circuit, the incoming group selector INC.GS' and the selectors III.GS' and FS' to the subscriber's line D.

Figure 2:
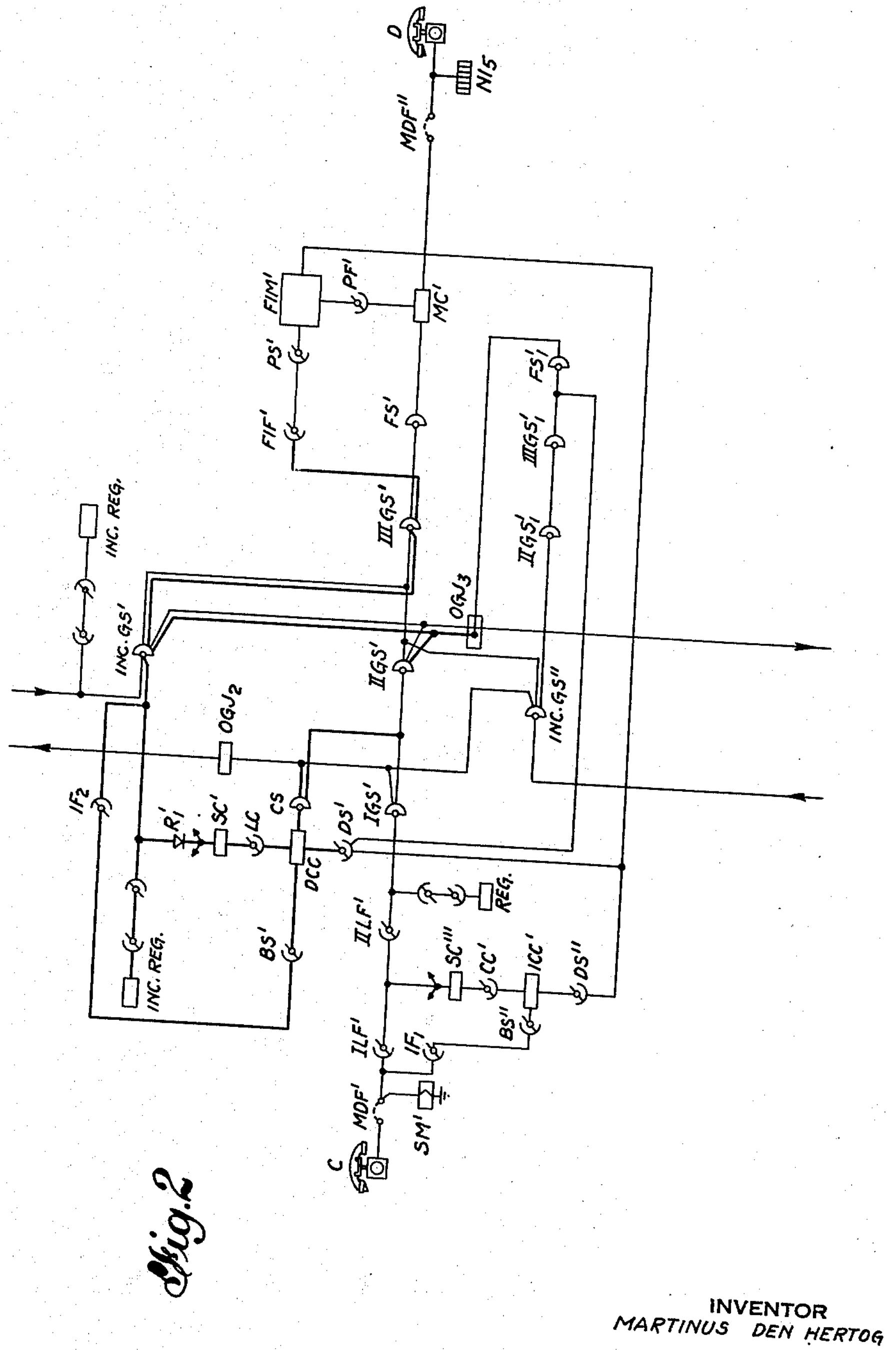
Fig. 2 shows the junction diagram of the second exchange connected with the exchange of Fig. 1 via two groups of junctions, one for the traffic in each direction.

For the sake of completeness, Figs. 1 and 2 also show the members via which a subscriber C of the exchange (Fig. 2) may build up a connection to a subscriber B of the exchange (Fig. 1), for which separate junction circuits for the traffic in this direction have been provided between said exchanges.

Figure 3:
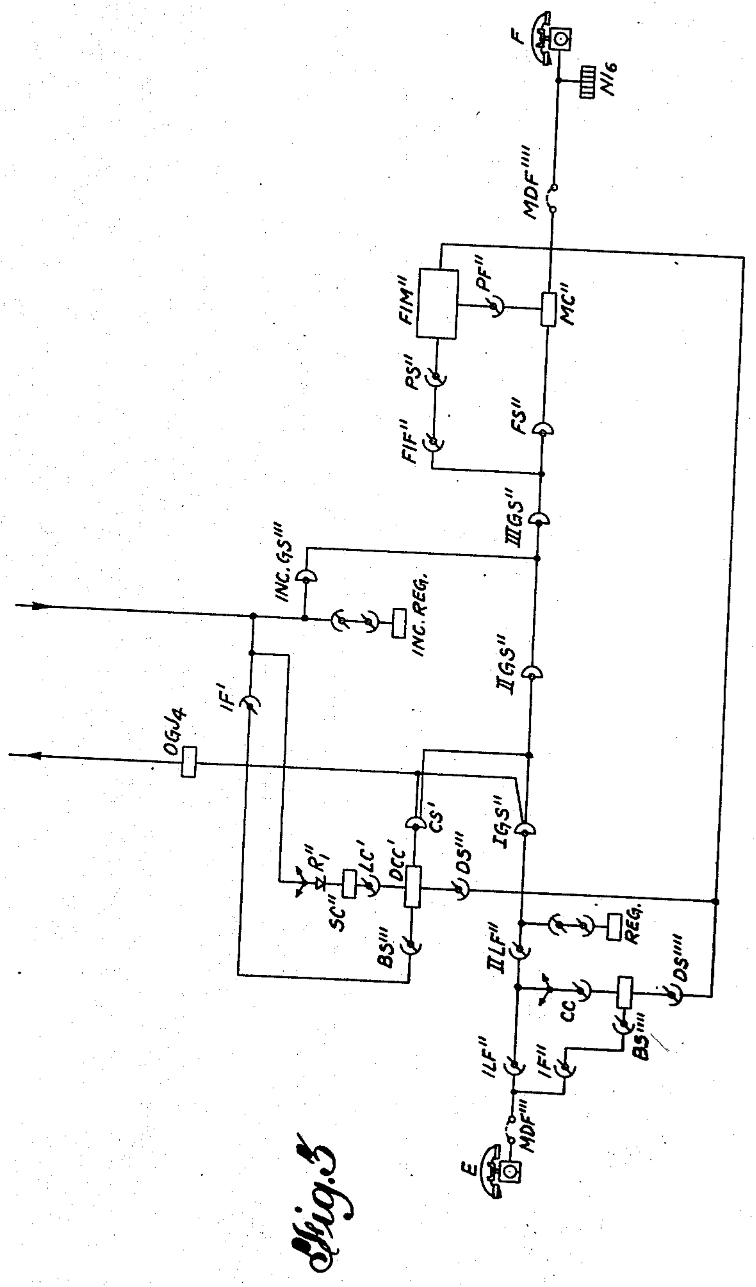
Fig. 3 is the junction diagram of a third exchange which in turn is connected by two groups of junctions to the exchange of Fig. 2.

By combining Figs. 1, 2 and 3, one above the other, it also becomes clear how a connection may be built up via more than one junction in tandem, e. g. from subscriber A in Fig. 1 to subscriber F in Fig. 3 via the exchange of Fig. 2 viz. via I.LF (Fig. 1), II.LF, IGS, $OGJ_1$, junction from Fig. 1 to Fig. 2, INC.GS' (Fig. 2) $OGJ_3$, junction from Fig. 2 to Fig. 3, INC.GS''' (Fig. 3), III.GS'', FS'', to subscriber's line F. Reversely a connection may be obtained from subscriber E in Fig. 3 to subscriber B in Fig. 1 via the exchange of Fig. 2, via I.LF'' (Fig. 3), II.LF'', I.GS'', $OGJ_4$, junction from Fig. 3 to Fig. 2, INC.GS'' (Fig. 2), $OGJ_2$, junction from Fig. 2 to Fig. 1, INC.GS, III.GS and FS to subscriber's line B.

By way of example it is shown in Fig. 1 how in case of a false call from e. g. the line A the later is switched through a common false call circuit MFC, viz. via II.LF and the finders FF and MF which for this purpose are connected up to the cord circuit seized by the false call.

Indentification of e. g. the calling line A in Fig. 1 may take place in the following cases:

(a) In case of a false call wherein identification may be requested by the common main false call circuit MFC and the number of the calling line will then appear on a number indicator $NI_1$ associated with MFC.

(b) In case of a call to a rapid call junction CLRJ wherein the request for identification is effected by pressing a key IK by the rapid toll operator and then the calling number will appear on a number indicator $NI_2$ associated with the operator's position.

(c) In case of a malicious call to another subscriber's line, e. g. B in Fig. 1. For this purpose the subscriber's line equipment at the exchange of line B is provided with a special matching equipment MC with the aid of which, in case of a malicious call, the subscriber B may initiate the identification of the caller, the number thereof appears on a number indicator $NI_3$ provided at an operator's position.

(d) In case the calling subscriber's line is provided with a device for printing the calling subscriber's number upon absence or with a device for indicating the calling subscriber's number when answering. In both cases the called subscriber's line at the exchange is equipped with an additional matching equipment (MC) from which the identification is initiated and which causes the calling number to be transmitted via the subscriber's line to the equipment at the subscriber's station, e. g. the number indicator $NI_4$. In both cases c and d the identification is requested from a control circuit FIM common to the various subscriber's line equipments.

(e) In case the identification is requested from an exchange which via one or more junctions in tandem is connected with the exchange to which the calling subscriber is connected, the identification is requested from a selector circuit $FS_1$, e. g. (Fig. 1), with the aid of which from the distant exchange a by-path via another junction is established to the outgoing end of the junction which was used for building-up the connection.

(f) Other cases in which identifications may be requested have not been shown on the drawings and e. g. relate to identifying calls for automatically printing metering tickets with automatic toll calls in which case the identification is requested from the toll equipment.

In all above-mentioned cases on behalf of identification use is made of a conductor which from the line equipment of the calling line is galvanically connected through finder and selector stages to the equipment from which the identification is requested. To this end, in the described embodiment the so-called metering wire, that is to say the conductor in the subscriber's line circuit, with which a service meter is connected, is used. For the sake of clearness this wire is indicated by a separate thicker line in Fig. 1 and in case of a local call, it is galvanically connected through the line finder circuit, the cord circuit and all local group selector stages to the final selector stage. Furthermore for distance calls this wire is galvanically connected to the outgoing end of distant (two wire) junctions from which a physical connection may be obtained to the selector $FS_1$ serving for setting a by-path for identification between distant exchanges. In case of false calls the metering wire, via the finder circuit FF for false calls or malicious calls and a finder MF, is connected to a main malicious call circuit MFC if these circuits are connected with a cord circuit. From the final selector circuit the metering wire (either directly via a wiper of the final selector if the latter is available, or otherwise indirectly via a by-path which is provided by specially provided circuits for this purpose) may be connected through to the equipment of a called line which said equipment is indicated by MC in Fig. 1. The special by-path circuits in question have been shown in Fig. 1 by the control circuit FIM comprising the finders PF and PS with the finder circuit FIF.

It follows from the above statement, that the metering wire may lead galvanically to all circuits, from which identification may be requested at the same exchange to which the calling subscriber is connected-up.

In case of connections which are built-up via an incoming circuit for junctions, the conductor which in the selector stages to be mentioned hereinafter for identification, terminates into this incoming circuit on a conductor which as regards identification performs the same functions as described above for the metering wire and which in an analogous manner is called "metering wire," though in this case no metering can take place via this conductor.

In accordance with the described embodiment the metering wire is used for identifying the number of a calling subscriber and for this purpose the said conductor is individually connected for each subscriber in the subscriber's line circuit, viz. in the terminal arc of one or more specially allotted identification finders IF, provided in common, e. g. per two groups of each one hundred subscribers. The finder switches in question therefore include the metering wires exclusively as part of the subscriber's circuits.

In the incoming circuit of junctions the so called "metering wire" is also connected in the terminal arc of one or more specially allotted identification finders $IF_2$ (Fig. 2) which is or are provided for each group of junctions, incoming from a same distant exchange, or, in case this number equals e. g. more than 100 for one or more groups (which amount corresponds with the number of outlets of $IF_2$) for each sub-group of 100 lines or less.

In the line finder circuit I.LF, the metering wire, via a small rectifier $R_1$, is connected to a common point to which all line finders, each of which in the described embodiment serve two groups of hundred lines, are connected, wherein this point is further connected to an identification starting circuit SC, which is also provided per two hundred lines. The arrangement is such that each of the starting circuits belongs to a group of finders IF, serving the same two hundred lines.

In the incoming circuit for junctions (Fig. 2), the so called "metering wire" is also connected via a rectifier ($R_1'$) to a common point to which all circuits of a group or sub-group are connected, wherein this point is further connected to an identification starting circuit SC', being also provided per group or sub-group, and wherein the arrangement is such, that each of these starting circuits belongs to a group of finders $IF_2$ serving the same group or sub-group of incoming junctions from a same distant exchange.

It is assumed that the operation of the service meter SM takes place by connecting a negative potential of 48 volts via 250 ohms to the metering wire.

*Identification in case of a local call*

A short general description of the identification operations in the case of a local call will first of all be given in relation to Fig. 1.

Assuming for example that a false call occurs, for instance when the line conductors leading to subscriber A are permanently bridged, the register REG will eventually detect this false call and will cause a master false call circuit MFC to become attached to the cord circuit via finders MF and FF, whereby the false call can be signalled to said false master call circuit MFC. The above is well known and need not be described further, the invention being primarily related to those operations which start as soon as a circuit, e. g. MFC, requests an identification.

For such a purpose, the main false call circuit MFC will connect a small positive potential indicated by +15 v. on Fig. 1 to a conductor indicated by a thick line and leading to the cord circuit. The connection of this small positive potential to the cord circuit is effected by means not shown but which may consist of an operator's key or relay contacts in the main false call circuit MFC.

This positive potential of +15 v. is applied via a resistance (not shown) and accordingly a reduced positive potential will appear at rectifier $R_1$, this being due to the potentiometer effect produced by the subscriber's meter SM. This reduced positive potential is not sufficient to cause the operation of the subscriber's meter SM, but will be sufficient to operate the starting circuit SC. The starting circuit SC will now hunt by means of the finder CC for a free identification common circuit ICC. Upon said identification common circuit becoming attached to the starting circuit SC, the latter will now transmit some digital information concerning the number of the calling subscriber A. This can be done due to the fact that the starting circuit SC is provided in common for a predetermined group of subscriber's lines and will be obtained in co-operation with a finder DS which is associated with the identification common circuit ICC. Said transferring of preliminary digital information to the identification common circuit ICC will become more apparent from the detailed description.

Finder BS which is also attached to the identification common circuit ICC will now be made to hunt for an identification finder IF which serves the same group of lines as that served by the starting circuit SC.

Upon said identification finder IF having been seized, it will be made to hunt under the control of the identification common circuit ICC for said reduced positive potential which is present on the metering wire indicated by a thick line on Fig. 1.

All the subscriber's metering wires in the group served by the starting circuit SC and by the identification finder IF are connected in one or more banks of the identification finder IF. In this manner, when the finder IF has found said reduced positive potential on the metering wire of subscriber A, its position will be characteristic for the calling subscriber A. Accordingly, additional digital information can now be sent into the identification common circuit ICC. Again, this will be performed with the help of finder DS in a manner which will become more apparent from the detailed description.

The finder DS having now performed its auxiliary functions in connection with the determination of the calling subscriber's number for the identification common circuit ICC, it will now be made to hunt, under the control of the identification common circuit ICC, for by-path conductors leading to the circuit which requested the identification, i. e. MFC.

It may be remarked that as soon as the identification finder IF is in its through condition, the common identification circuit ICC will cause the positive potential at the metering wire to be decreased in such a manner that it will no longer be sufficient to maintain the starting circuit SC in its actuated condition whereby the latter will be released and made available for other identifications. At the same time, the identification common circuit ICC will now be held via the identification finder IF and finder BS. Further, as soon as the complete digital information has been stored in the identification common circuit ICC, the latter will temporarily apply ground potential to the metering wire causing switching operations at the master false call circuit MFC whereby it will now be possible to set finder DS on by-path conductors directly leading to the master false call circuit MFC, the latter directly holding the identification common circuit ICC via finder DS. In these conditions, identification finder IF and finder BS can now be released.

The circuit which requested the identification, i. e. master false call circuit MFC will now signal to the identification common circuit ICC that this is the case of a local identification and accordingly, the identification common circuit ICC will now send D. C. impulses characterizing the calling subscriber's number on the number indicator $NI_1$ located in the master false call circuit MFC. Upon said number being obtained on the number indicator $NI_1$ the key can now be released whereby finder DS will be released and the identification common circuit ICC will be brought back to its normal condition.

The above operations will become more apparent in relation to Figs. 4 to 7 which represent in detail parts of the circuits shown in Fig. 1 and which have been referred to above.

A detailed description will now be given in connection with Figs. 4, 5, 6 and 7 of the manner in which a line can be identified from a master false call circuit MFC.

Assuming that the key K is depressed, or that a relay with contacts corresponding to those of the key is energized, relay Dr is operated over break contacts $Si_1$ and $E_5$. The energization of relay Dr will cause relay Er to be operated over make contact $D_2$. Both relays are provided with a holding circuit including respectively make contact $D_1$ and make contact $E_1$. The switching over of the key K will also result in the source of positive potential +V being applied to the cord circuit of the connection via resistor $r_3$, make contact $D_3$, circuit of the finder MF which has become attached to the cord circuit and from there via the circuit of second line finder IILF, circuit of first line finder ILF, metering wire and subscriber's meter SM to ground. All the above mentioned finders can be assumed to be in their through condition, this having been performed in the usual manner, which has no bearing upon the present invention, by means of additional circuitry and brushes (not shown). A through-circuit being now established from the source of positive potential +V to ground, a positive potential will now appear in the line finder circuit ILF which is sufficient to make rectifier $R_1$ conductive whereby this positive potential will be able to actuate a static switch $SS_1$ of the kind described in the application of L. Cabes, Serial No. 765,022, filed July 31, 1947. This static switch $SS_1$ is such that when a positive potential is applied via rectifier $R_1$, and if such potential is above a predetermined threshold value, it will be actuated and this will cause the energization of relay Ar. The positive potential will however not be sufficient for the operation of the subscriber's meter SM. The relay Ar will release if the voltage falls below this threshold value.

The static switch $SS_1$ is located in an identification starting circuit SC, which is provided in common for a group of 200 lines.

As soon as relay Ar is attracted, it will close an operating circuit for the power magnet CCM via break contact $T_1$, make contact $A_2$ and break contact $B_2$. This power magnet CCM controls a finder CC which is provided for each identification starting circuit SC and which will now hunt for a free identification common circuit ICC. A free identification common circuit ICC is characterized by having a test potential provided from negative battery via the winding of relay Clr, break contact $Ad_5$, brush SSa of a step-by-step switch SS pertaining to each identification common circuit ICC, off-normal contacts $BSON_1$ and $DSON_1$ of finders BS and DS also attached to circuit ICC, to a contact in the "d" bank of finder CC. Upon the brush CCd meeting this test potential, test relay Tr (SC) will be energized via make contact $A_4$, by means of its high resistance winding. The usual double test relay SR is also provided, said relay having a low resistance winding and becoming energized via make contact $T_1$ if there is no double test. In well known manner, the energization of test relay Tr will interrupt the operating circuit for the power magnet CCM at make contact $T_1$ whereby the finder CC will stop on a free identification common circuit ICC. Simultaneously with relay Sr, relay Clr (ICC) will be energized and via make contact $Cl_1$, break contact $Sd_9$ and make contact $A_3$ and $S_4$, an operating circuit will be prepared for relay Adr.

Since the identification starting circuit SC serves a group of 200 lines, the particular 200-line group in a 1000 line group must be indicated to the identification common circuit ICC, and this will be performed by bridging terminals such as 1—1', 2—2' and 3—3' (SC) in a combination which depends upon the particular 200 group in a 1000-line group which is served by the identification starting circuit SC. This will be better understood by referring to the following table giving an example of bridging the terminals such as 1—1' in accordance with the 200-line group which is served. Depending upon this, a corresponding combination of relays Aar, Abr and Acr will be energized in the identification common circuit ICC when relay Sr is attracted.

| 100-line groups | Pairs of terminals through connected | Operated relays in ICC |
|---|---|---|
| 0-1 | 2—2', 3—3' | Abr, Acr |
| 2-3 | 1-1' | Aar. |
| 4-5 | 2-2' | Abr. |
| 6-7 | 3-3' | Acr. |
| 8-9 | 1-1', 3—3' | Aar, Acr. |

In accordance with the above mentioned table, if e. g. the group of lines 200—399 is served by the identification starting circuit SC, relay Aar will be energized over resistor $r_4$, terminals 1—1', make contact $S_1$, brush CCa, conductor $a_1$ and break contact $Ad_7$. The energization of relay Aar will now cause the operation of relay Br via make contact $S_4$, its two windings in series make $A_3$, brush CCe, conductor $e_1$, break contact $Sd_9$ and make contacts $Cl_1$ and $Aa_2$. In operating, relay Br will close a holding circuit via its low resistance winding and make contact $B_1$, this allowing relay Adr to be also energized. The energization of the latter relay then causes the interruption of the operating circuit for relays Tr and Sr, at make contact $Ad_5$, whereby these last two relays release as well as relay Clr in the identification common circuit ICC. Also, as soon as relay Aar is attracted, it will be held over make contacts $Aa_1$ and $Cl_2$; similar holding circuits being provided for relays Abr and Acr, if these are also energized. The release of relay Clr will not, however, cause the de-energization of relay Adr since a holding circuit is provided for the latter via make contact $Ad_1$, break contacts $Hl_2$ $Pp_1$, $Hm_1$, $Pq_1$, and $Sd_9$. Also, the release of relay Tr will not restart the power magnet CCM since the operating circuit for the latter is now interrupted at make contact $B_2$ The release of relay Tr will permit relay Cr to be energized over make contacts $B_3$ and $A_2$ and break contact $T_1$.

Relay Sr now being released, and relay Aar (and/or Abr, Acr) being held over make contacts $Ad_4$ and $Aa_1$ (and/or $Ab_1$, $Ac_1$), conductors $a_1$ and $c_1$ leading from the identification common circuit ICC to the identification starting circuit SC are free to be used for sending additional information to the identification common circuit ICC. Via make contact $C_1$ of relay Cr (SC), an alternating current potential having a phase which is characteristic of the 1000-line group to which the identification starting circuit SC belongs and which is schematically indicated by $\phi_{Ba}$ will be applied to conductor $a_1$ and via make contact $Ad_7$ and break contacts $Sd_3$, $Ha_1$, will reach the alternating current comparator ACC located in the identification common circuit ICC.

This alternating current comparator is of well known design and has, for instance, been described in the application of L. Cabes, Serial No.

765,021, filed July 31, 1947. Such alternating current comparators permit the comparison of two alternating current signals having an equal amplitude but between which there is a difference of phase. If this phase difference reaches a predetermined value, e. g., zero, the alternating current comparator reacts.

At the same time that the alternating current signal is applied to the marking side of the alternating current comparator ACC, the finder DS will be started, its power magnet DSM being energized over the following circuit: break contacts $Zm_1$, $Sa_4$ of relays $Zmr$ and $Sar$, make contact $Ad_6$ and break contacts $Gs_1$, $Ot_1$ and $Et_1$.

The first ten contacts in the "e" bank of the finder DS are each separately connected to an alternating current source, i. e., $\phi_{B1-10}$, each having a characteristic phase and each of said characteristic phases corresponding to a thousands digit. Accordingly, when the brushes of switch DS and more particularly the brush $DS_e$ reach the contact to which an alternating current voltage, e. g. $\phi_{Ba}$ is connected and bearing said predetermined phase relationship, e. g. same phase, to the alternating current voltage which has been connected to the comparator ACC from the starting circuit SC, the comparator ACC will react, since the alternating current potential found via brush DSe can reach the comparator via break contact $Ha_3$.

The operation of the comparator ACC will cause the immediate but temporary energization of relay Gsr, said energization interrupting the operating circuit for the power magnet DSM at make contact $Gs_1$. It should be understood that this temporary energization of relay Gsr is to be obtained by additional circuitry, not shown, by means well known to those skilled in the art. The temporary energization of relay Gsr will then cause the step-by-step switch SS to make one step, this being schematically indicated on the figure by the connection of an earth to the step magnet SSM via make contact $Gs_2$. Before the step-by-step switch SS has time to move to its second position, relay Har will be energized over make contact $Gs_4$, brush SSa in its first position, make contact $Gs_8$, and break contact $Sd_8$. Via make contact $Ha_4$, auxiliary relay Sar will then be operated.

By the time step-by-step switch SS has moved to its second position, the number of the thousands digit will have been registered in the identification common circuit ICC by means of the three brushes DSa, DSb and DSc of the finder DS. These brushes are now resting upon a set of contacts in a position which is characteristic of the thousands digit. By means of suitable connections in the "a," "b," "c" contact banks of the finder DS, it is now posisble to register the thousands digit by using code relays. These connections have been diagrammatically indicated by $JF_1$ while the registering unit for the thousands digit has been diagrammatically indicated by Bar—Bdr. In well known manner, this registering unit comprises a set of four relays (not shown) which can be energized in various combinations so that they will store the thousands digit on a binary basis, e. g., the well known 1-2-4-6 binary code. The storing of the information of the registering unit Bar—Bdr will be performed when the alternating current comparator ACC reacts thereby operating temporarily relay Gsr, the latter then applying ground to the brushes DSa, DSb, DSc via conductors $a_2$, $b_2$, $c_2$ and make contacts $Gs_5$, $Gs_6$, $Gs_7$. Since relay Gsr is only temporarily attracted, holding means (not shown) will be provided in well known manner for the four code relays (not shown) which form the essential part of the registering unit Bar—Bdr.

It is to be noted that when the step-by-step switch SS has reached the second position, relay Gsr has already released and accordingly relay Sbr cannot then be energized. On the other hand, the release of relay Gsr will not affect the operated relay Har since the latter is maintained in its attracted position via make contacts $Ha_2$ and $Ad_3$.

As soon as relay Gsr has released and since relays Har and Sar are now energized, an operating circuit is now closed for the power magnet BSM of the finder BS, over the following circuit: break contact $Sb_3$, make contacts $Sa_4$ and $Ad_6$, and break contacts $Gs_1$, $Ot_1$, $Et_1$, whereby finder BS will start hunting for an identification finder IF.

It is to be noted that when relay Cr in the starting circuit SC energizes, it connects brush CCc of finder CC to multiple point Q via make contact $C_3$. This multiple point Q leads to all the identification finder circuits which serve the same group of 200 lines as that which is served by the identification starting circuit SC.

Since relay Har is operated as soon as the alternating current comparator ACC reacts for the first time, a loop circuit for an alternating current voltage $\phi_x$ having a phase which is characteristic for each identification common circuit ICC is closed via the following circuit: break contact $Sc_7$, make contacts $Ha_6$ and $Ad_8$, conductor $c_1$, brush CC of finder CC, make contact $C_3$, multiple point Q, break contact $Ar_6$ of relay Arr in the identification finder circuit, brush BSe of finder BS, break contact $Sc_{10}$, make contact $Ha_3$ to the testing side of the alternating current comparator ACC, marking side of the comparator ACC, make contact $Ha_1$ and break contact $Sc_9$, it being understood that this loop circuit is completed when the brushes of finder BS reach an identification finder circuit to which the alternating current voltage having a characteristic phase $\phi_x$ is applied via multiple point Q. When such an identification finder circuit is reached, the alternating current comparator ACC, which in this particular embodiment has been designed to react when the difference in phase between the marking and the test voltages is equal to zero, will be actuated for the second time, thereby causing a second energization of relay Gsr. The operation of the latter relay will cause the interruption of the circuit for the power magnet BSM, at make contact $Gs_1$, and accordingly the finder BS will be made to stop on a suitable identification finder circuit.

Remembering that the step-by-step switch SS is now on its second position, the new and temporary energization of relay Gsr will now cause the operation of relay Sbr via make contact $Gs_4$ and brush $SS_{a1}$. When relay Sbr operates, a holding circuit for said relay is prepared via make contact $Sb_1$, winding of Scr, make contacts $Ha_2$ and $Ad_3$, and when step-by-step switch SS moves to the third position as a result of the temporary energization of relay Gsr (make contact $Gs_2$), relay Scr being no longer short-circuited to ground at make contact $Gs_4$, will be energized.

As soon as relay Sbr energizes, relay Arr in the identification finder circuit is energized over break contact $Br_2$, brush BSa, conductor $a_3$, make contact $Sb_5$ and break contact $Sd_4$. The energization of relay *Arr* will now complete an operating circuit for the power magnet IFM of the identification finder IF via the following circuit: make contact $Ar_5$, break contact $Br_3$, brush BS*c*, conductor $c_3$, make contacts $Sb_3$, $Sa_4$, $Ad_6$ and break contacts $Gs_1$, $Ot_1$, $Et_1$.

The identification finder IF will now be made to hunt for the subscriber's line in the particular 200-line group served by by the finder IF, whose metering wire has a positive potential as obtained from the source +V connected to said metering wire via the key K. In the particular embodiment which is now being described and since each group of identification finders serves a 200-line group, two brushes, i. e. IF*c* and IF*e* are used for testing for the presence of positive potential on the subscriber's meter conductor, this being desirable if hundred-points switches are used.

When one of the brushes, e. g. IF*c*, of the identification finder IF meets the required positive potential on the metering conductor, this will reach a static switch $SS_3$ in the identification common circuit ICC over brush IF*c*, make contact $Ar_1$, break contact $Br_4$, brush BS*b*, conductor $b_3$, make contact $Sb_2$ and break contact $Sd_{10}$. This static switch $SS_3$ is identical to that which is used in the starting circuit SC, i. e. $SS_1$. Upon said positive potential on the metering wire being found, the static switch $SS_3$ will react causing the energization of relay *Otr*, since contact $Sc_3$ is closed, relay *Scr* being operated. In the particular embodiment described, it has been assumed that the metering wires of an odd 100-line group are connected in the "*c*" bank of the identification finder IF, while the metering wires for the even 100-line groups are connected in the "*e*" bank of the identification finder IF. In the latter case, the circuit goes over brush IF*e*, make contact $Ar_3$, brush BS*d*, conductor $d_3$, make contact $Sb_4$ to the static switch $SS_2$, similar to the static switches referred to above, whereby relay *Etr* would be energized when the required positive potential is met on the metering wire.

As soon as one of the static switches $SS_2$ or $SS_3$ reacts, the identification finder IF will be made to stop on the required set of terminals. Also, when relay *Gsr* was operated for the second time (during search for a suitable identification finder), it caused step-by-step switch SS in the identification common circuit IC to make a second step by means of make contact $Gs_2$ whereby the brushes of said step-by-step switch SS were moved to the third position.

In this position, relay *Sdr* is now energized over brush SS*a* in the third position and either of make contacts $Ot_2$ or $Et_2$. As soon as relay *Sdr* operates, it locks over make contacts $Sd_1$ and $Ad_3$.

Since the energization of either relay *Otr* or relay *Etr* interrupts the circuit for the power magnet IFM at make contacts $Ot_1$ or $Et_1$, the finder IFM is made to stop. Also, the operation of *Sdr* interrupts at make contact $Sd_4$ the ground which was supplied via conductor $a_3$ and brush BS*a* to relay *Arr*. The latter was, however, provided with a holding circuit over make contact $Ar_7$, winding of relay *Brr*, brush BS*e* and make contact $Sb_6$. Accordingly, when the ground is interrupted on conductor $a_3$, relay *Brr* is no longer short-circuited and operates in series with the already operated relay *Arr*.

It is to be noted that upon the energization of relay *Sdr* relay *Har* is made to release (make contact $Sd_8$), and accordingly relays *Sar*, *Sbr* and *Scr* also release (break contacts $Ha_4$ and $Ha_2$). The ground which is supplied to conductor $e_3$ and brush BE*e* for the operation of relays *Arr* and *Brr* will now be provided over make contact $Sd_7$. Relay *Otr* (or *Etr*) will release but if relay *Otr* has been energized (odd 100-line group) relay *Oer* will be attracted over make contact $Ot_3$ and then held over make contacts $Oe_1$ and $Ad_2$.

It should be remarked that as soon as the identification finder IF is in its through condition, and since relay *Sdr* has been operated, an operating circuit will be closed for relay *Ppr* via brush IF*c* or via brush IF*e* and via make contact $Br_3$ or make contact $Ar_3$ to brush BS*c* or brush BSB*d*, and then via make or break contact $Oe_3$, make contact $Sd_5$ and break contacts $Sg_1$ and $Sa_8$. Relay *Ppr* is now in shunt across the subscriber's meter SM and accordingly, the positive direct current potential which was present at rectifier $R_1$ will now be reduced to such a value that it is no longer sufficient to maintain the static switch $SS_1$ in an actuated condition whereby the latter will release together with relays *Ar*, *Br*, and *Cr*. Relay *Adr* and the identification common circuit ICC which was previously maintained over make contact $Ad_1$, break contacts $Hl_2$, $Pp_1$, $Hm_1$, $Pq_1$ and make contact $Sd_9$, after having previously been held over conductor $e_1$, will now be held directly to ground in the identification common circuit ICC via make contact $Ad_1$, break contact $Hl_2$ and make contact $Pp_1$. Relay *Ppr* operates relay *Pqr*.

The starting circuit SC having now been released, it becomes available for other calls also requesting identification, in the group of 200 subscriber's lines which is served by the identification starting circuit. Also, it will be noted that relay *Ppr* is held energized under the direct control of the master false call circuit MFC. In this manner, the energization of *Adr* is under the control of circuit MFC, since the release of the key K would cause the release of relay *Ppr*, whereby, since the auxiliary relay *Pqr* has been attracted over $Pp_2$, relay *Adr* would be released, first at make contact $Pq_1$ and then at break contact $Sd_9$.

Relay *Brr* having been operated and the identification finder IF being now in its through condition, the identification common circuit ICC can now ascertain the full identity of the subscriber's line to be identified.

Since the identification starting circuit SC is provided with an alternating current voltage $\phi_{Ba}$ which is characteristic for the thousands digit and since this information has been transmitted to the identifictaion common circuit IC as described above, and stored in the registering unit *Bar*—*Bdr*, and since on the other hand, relays *Aar*, *Abr*, *Acr* have been energized in a combination which is characteristic of the 200-line group in which the line to be identified is located, while the electrical condition of relay *Oer* ascertains the hundreds digit, i. e. odd or even 100-line group in a 200-line group, there remains only to obtain the tens and units digits.

For this purpose, various alternating current potentials have been connected to the contacts in the "*a*" and "*b*" banks of the identification finder IF. Each contact in the "*a*" bank is connected to a particular alternating current potetnial which has a phase characterizing the tens digit, while each contact in the "*b*" bank is connected to an alternating current potential having a phase which is characterized for the units digit.

These have been respectively indicated by $\phi_{Cb}$ and $\phi_{Dc}$.

Since relays *Otr* or *Etr* are only temporarily energized, and since relay *Har* has been released, an operating circuit is again closed for the power magnet DSM of the finder DS which will now start a second hunting movement. Before the finder DS starts to hunt again, the alternating current potential, i. e. $\phi_{Cb}$ having a phase characterising the tens digit will be connected to the alternating current comparator ACC (marking side) via brush IF*a*, make contact $Br_2$, brush BS*a*, conductor $a_3$, break contacts $Se_2$ and $Sf_1$, make contact $Sd_3$ and break contact $Ha_1$. This characteristic alternating current potential should of course differ from the alternating current potentials $\phi_{B1-10}$ which were used for the thousands digit, since otherwise before the finder DS starts to hunt again, it might stop in the first field of bank contacts which was used for the determination of the thousands digit. As soon as the brush DS*e* of finder DS reaches a contact to which an alternating current voltage ($\phi_{C1-10}$) is connected and which corresponds to the alternating current voltage ($\phi_{Cb}$) marked on the comparator ACC, the latter will react for the third time, the test alternating current potential reaching the comparator ACC via brush DS*e* and break contact $Ha_3$. Accordingly, relay *Gsr* will be energized for the third time and will cause the finder DS to stop and the step-by-step switch SS to be moved to its fourth position, i. e. by means of make contact $Gs_2$. Before the step-by-step switch SS has time to move to its fourth position, the temporary energization of relay *Gsr* will apply ground to brushes DS*a*, DS*b* and DS*c*, respectively, via make contacts $Gs_5$, $Gs_6$ and $Gs_7$. Since these brushes are now resting in a position characteristic for a particular tens digit, it is possible by means of suitable connections to the bank contacts (diagrammatically indicated by $JF_2$) to store the tens digit into a second registering unit diagrammatically indicated by *Car*—*Cdr*. This second registering unit is similar to the first registering unit which was used to store the thousands digit and accordingly need not be further described.

As soon as the step-by-step switch SS reaches its fourth position, relay *Ser* will be energized over make contacts $Sd_2$, $Pp_3$, and brush SS*a* and will be held over make contacts $Se_1$ and $Ad_3$. By the time relay *Gsr* releases, and thus again closes the operated circuit for the power magnet DSM at break contact $Gs_1$, the units digit will have been marked on the comparator ACC via the following circuit: Alternating current potential $\phi_{Dc}$, brush IF*b*, make contact $Br_7$, brush BS*b*, conductor $b_3$, make contact $Se_2$, break contact $Sf_1$, make contact $Sd_3$ and break contact $Ha_1$. Hence, the finder DS will hunt for the third time and by taking care that the alternating current potentials characterizing the units digits are different from those alternating current voltages characterizing the tens digits, the finder DS will stop in the third field of bank contacts when brush BS*e* reaches a contact to which a corresponding alternating current potential ($\phi_{D1-10}$) is connected. At this time, the alternating current comparator ACC will react for the fourth time thereby stopping finder DS on the required position. Again, by providing suitable connections to the third field of terminals (diagrammatically indicated by $JF_3$), it will be possible to store the units digits into a third registering unit *Dar*—*Ddr*. This, again occurring by means of an earth connected to the "*a*," "*b*," "*c*," wires via make contacts $Gs_5$, $Gs_6$, $Gs_7$.

The step-by-step switch SS will again make one step, and will reach its fifth position in which relay *Sfr* will be energized over brush SS*a* and make contact $Sd_2$. Relay *Sfr* will then be held energized over make contact $Sf_4$, winding of relay *Sgr* and make contact $Ad_3$. Relay *Sgr* will later be operated via this holding circuit.

As soon as relay *Sfr* operates, it will interrupt the previously established marked circuit to the comparator ACC at make contact $Sf_1$, and it will also short-circuit relay *Ppr* via make contacts $Sf_3$ and $Ad_3$.

In this way, it will be seen that ground potential is temporarily applied to the metering conductor from the identification common circuit ICC and via make contacts $Ad_3$ and $Sf_3$, break contact $Sg_1$ of relay *Sgr* (which is not yet operated but will operate soon after *Sfr* upon the release of *Ppr*), make contact $Sd_5$, make or break contact $Oe_3$ to brushes BS*c* and IF*c* or to brushes BS*d* and IF*e*.

This ground reaches the master false call circuit MFC, which requested the identification, via first line finder circuit ILF, second line finder circuit IILF, circuit of finder MF and make contact $D_3$. The junction point of the rectifier $R_2$ and resistor $r_3$ being now temporarily connected to ground in the identification common circuit ICC, current will now be able to flow from the source of positive potential +V to ground via rectifier $R_2$ and relay *Sir* which will be temporarily energised. Also relay *Ar* will release because of the ground applied to the circuit SS*l*. The temporary energization of relay *Sir* in the master false call circuit MFC will interrupt the holding circuit for relay *Dr*, at make contact $Si_1$ whereby this relay will release. On the other hand, relay *Er* will remain held over make contact $E_1$ and a contact of the key K. When relay *Sgr* operates, following the release of relay *Ppr*, ground will no longer be applied to the metering wire and accordingly, relay *Sir* in the master false call circuit MFC will release, but this will not affect relay *Dr* which remains in the unoperated conditions since relay *Er* is still energized.

The release of relay *Ppr* when it is short-circuited will cause the subsequent release of relay *Pqr* at break contact $Pp_2$, but relay *Adr* will not release, being now held over make contact $Sg_2$, break contact $Hl_2$ and make contact $Ad_1$.

The de-energization of relay *Dr* in the master false call circuit MFC will now permit the finder DS to be connected to the master false call circuit MFC by means of by-path conductors. To this effect, the alternating current potential which which is characteristic for the particular identification common circuit ICC is now applied to the marking side of the comparator ACC via make contact $Sf_2$. On the other hand, in the same manner as what was done to obtain access to a suitable identification finder IF, this characteristic alternating current potential will also be used as test potential. This occurs via the following circuit: make contact $Sf_2$, break contact $Ha_1$, make contacts $Sd_3$ and $Sg_1$, make contact $Sd_5$, and make or break contact $Oe_3$ to break contact $D_3$ (MFC) via the circuit of the identification finder IF and the metering wire, conductor $e_4$, a contact in the "*e*" bank of finder DS, brush BS*c* of this finder when it reaches said contact and break contact $Ha_3$. As in the previous cases, the circuit for the power magnet DSM will have been re-closed via break contact $Gs_1$ when relay *Gsr* releases, said release time being sufficient to cover the operations described, i. e. energization of relays *Sfr, Sgr, Sir* and de-energization of relay *Dr*. Accordingly, when the required set of contacts leading to the master false call circuit MFC which originated the identification operations, is found, the comparator ACC will react for the fifth time, the operating circuit for the power magnet DSM being again opened at make contact $Gs_1$. This time, the temporary energization of relay *Gsr* will not affect the step-by-step switch SS since the contact $Sg_3$ is now open.

The finder DS having now been set on the by-path conductors leading to the master false call circuit MFC, there remains only to send the digital information stored in the identification common circuit ICC, into the master false call circuit MFC, by transferring this digital information on the number indicator NI (MFC).

When the comparator ACC is actuated for the fifth time, the temporary energization of relay *Gsr* will now cause the operation of relay *Zmr* via make contacts $Gs_9$ and $Sg_5$. Relay *Zmr* is then maintained independently of *Gsr* via make contact $Zm_2$ and will prevent further movement of finder DS by opening contact $Zm_1$. Also, referring to the master false call circuit MFC, when relay *Dr* releases, an operating circuit for relay *Cor* will be prepared over make contact $E_4$ and break contact $D_4$. When the finder DS has been set on the by-path conductors leading to the master false call circuit, relay *Cor* (MFC) will then be energized over make contact $E_4$, break contact $D_4$, conductor $C_4$, brush DSc, conductor $c_2$, make contact $Sg_4$, winding of relay *Hlr* and either of make contacts $Lo_2$ or $Di_2$. In this circuit relay *Hlr* which is the holding relay for the identification common circuit ICC will also be energized and accordingly, the identification common circuit is now held directly from the master false call circuit MFC from which the identification was originated since relay *Adr* is now held over make contacts $Ad_1$ and $Hl_4$. Relays *Lor* and *Dir* are respectively the local identification relay and the distant identification relay. Their operation was obtained by providing a ground to conductor $a_4$ in the master false call circuit via break contact $Co_3$ in the case of a local identification or by providing ground to conductor $b_4$, by means not shown, in the case of a distant identification, whereby relay *Lor* or *Dir* is energized over make contact $Zm_3$ or $Zm_4$ and break contact $Lo_5$ or $Di_5$. Relay *Lor* is held independently of relay *Cor* via make contacts $Lo_1$ and $Ad_9$. Should the distant identification relay *Dir* be operated, it would also be held over a similar circuit including make contacts $Di_1$ and $Ad_9$.

It will be appreciated that in the system described above, contrary to previous arrangements in which the signalling of the calling subscriber's number had to take place by means of voice frequency signals via the metering wire, it is now possible, in the case of a local identification, to send the number of the calling subscriber by means of D. C. impulses, directly to the number indicator NI. This has the advantage that the circuit which requested an identification, e. g. the master false call circuit MFC, does not need to comprise a voice frequency receiver nor direct current impulse repeating relays.

All the digital information concerning the calling subscriber's number being now stored in the registering units *Bar—Bdr, Car—Cdr, Dar—Ddr*, and in the relays *Aar, Abr, Acr*, as well as *Oer*, an impulse sender diagrammatically shown by IS will now be started (schematically indicated by contact $Hl_1$) and will send direct current impulses characterizing the calling subscriber's line number via make contacts $Lo_3$ $Lo_4$, break contacts $Di_3$, $Di_4$, brushes DSa and DSb and conductors $a_4$ and $b_4$ to the stepping and shift magnets STM and SHM via make contacts $Co_1$ and $Co_3$. The first series of direct current impulses over brush DSb will be used to operate the stepping magnet STM of the number indicator NI via make contact $Co_1$, while the second series of direct current impulses sent over brush DSa is used to operate the shift or shift and print magnet SHM, via make contact $Co_3$, after the impulses for each digit have been received at the stepping magnet STM. Contacts $Aa_3$, $Ab_3$, $Ac_3$ and $Oe_2$ have been shown to indicate in a schematic manner that the impulse sender IS uses the information derived from the electrical condition of relays *Aar, Abr, Acr, Oer*, i. e. hundreds digit.

Neither the impulse sender IS nor the number indicator NI have been shown in detail since they can be considered as well known pieces of apparatus for automatic telephone systems and since their particular design is not relevant to the present invention.

It should be noted that if the request for the identification was received from a distant exchange, a voice frequency impulse sender will be used instead of the direct current impulse sender IS. This voice frequency impulse sender has been diagrammatically represented by ISVF and will become attached to the brushes DSa and DSb if the distant identification relay *Dir* is operated, i. e. when a ground is supplied to conductor $b_4$.

A detailed description of the identification operations which occur when the identification is required from a distant exchange will not, however, be given since these operations are identical to those described above in connection with a local identification, the only difference residing in the manner in which the digital information is transmitted from the identification common circuit ICC to the circuit which requested the identification.

It is to be noted that when relay *Zmr* energizes after switch DS has been set on the by-path circuit, the circuit for the power magnet BSM is closed via off-normal contact $BSON_2$ and make contact $Zm_5$ whereby finder BS returns to its normal position. This, in its turn, will cause finder IF to be returned to its home position, since relays *Arr* and *Brr* release, the circuit for the power magnet IFM being closed over off-normal contact $IFON_1$ and break contact $Ar_4$.

When the number of the calling subscriber has been obtained on the number indicator NI, the release of the identification common circuit ICC will be obtained by releasing key K whereby relay *Er*(MFC) will be released causing the subsequent release of relays *Cor*(MFC) and *Hlr*(ICC). The release of the latter relay will interrupt the holding circuit for relay *Adr* at make contact $Hl_4$ and relay *Adr* will release. This is due to the fact that when relay *Hlr* energized, it caused the operation of the auxiliary relay *Hmr* via make contact $Hl_5$, whereby since relay *Hmr* will release after relay *Hlr*, the original holding circuit for relay *Adr* will be momentarily opened at contact $Hm_1$ causing the release of relay *Adr*.

When relay *Adr* releases, relays *Sdr, Ser, Sfr, Sgr* will all release since their holding circuit is now interrupted at contact $Ad_3$. The release of relay *Sgr* will cause the release of relay *Zmr* (at contact $Sg_5$) whereby a circuit will now be closed for the power magnet DSM of finder DS via break contact $Zm_1$, off-normal contact $DSON_2$ and break contact $Ad_9$. In this manner, finder DS will be returned to the normal position. Also, when relay *Adr* is released, step-by-step switch SS will be returned to the home position (break contact $Ad_{10}$ and off-normal contact $SSON_1$). Relays *Aar, Abr, Acr, Oer, Lor* or *Dir* will also release (contacts $Ad_4$, $Ad_2$ and $Ad_9$) and the identification common circuit ICC will thus be brought back to its normal condition.

It has been mentioned above that characteristic signals will have to be provided to the identification common circuit ICC depending whether the identification is requested from a local circuit or from a circuit located at a distant exchange, e. g. ground on the "*a*" wire leading to brush DS*a* or ground on the "*b*" wire leading to brush DSB*b*. In a similar manner, other characteristic signals can also be sent to the identification common circuit causing the latter to vary the number of digits of the subscriber's number which have to be signalled to the circuit requesting the identification. In the above mentioned embodiment which was described in detail, it was assumed that the identification was requested by a local circuit in which case it is only necessary to signal the local subscriber's number. If a request for identification comes from a circuit which can only be reached over a junction, the finder DS will, in this case, be set on a selector $FS_1$ (e. g. Fig. 1) corresponding to a group of junctions from another network and this will be notified to the identification common circuit ICC by the provision of a third characteristic signal e. g. a simultaneous ground on the "*a*" and "*b*" conductors whereby, by means not shown but obvious to those skilled in the art, the identification common circuit will then cause the local subscriber's number to be signalled to the circuit requesting identification but preceded by the digits of the local prefix.

*Advantages of the use of direct current potential for identifying the calling line*

The use of a direct current potential for marking the calling line to be identified results in the following advantages:

I. If, during the course of the different functions performed by the identification circuits, a disturbance occurs, the identification circuit in some cases may break down the identification and then switch itself off. If this happens before the positive potential is removed from the metering wire in the circuit requesting identification, the potential on this metering wire is restored to its first value by the release of the identification circuit which disconnects the holding relay P*pr* from the metering wire, so that the starting circuit for the identification again operates and the identification process commences again. This feature of the invention is made possible by using a direct current potential both as starting potential and test potential for the identification circuits. When using direct current potentials, known means, such as polarized rectifiers, are used to obtain an accurate marginal working, so that a reduction of a potential already of small value may be positively recognized and may be used for initiating the operation of the starting circuit. In the circuit arrangements known hitherto, exclusive use was made of alternating current potentials for marking the calling line while the starting signal for the identification was given, this starting signal being given from the circuit which requested identification in addition to the marking signal and independent thereof. The starting signal could be disconnected by transmitting an alternating current signal from the identification circuit to the circuit requesting identification. After this disconnection-signal was once transmitted, however, the starting potential was broken and could not be closed again under the control of the identification circuit, e. g. in case of the disturbance as mentioned above.

II. The use of a direct current potential makes it possible also to hold the identification circuit under the control of the circuit requesting identification and under all conditions, so that if, for any reason whatsoever, the identification process were to be stopped or were to have to start again, it would be possible to release the identification circuit in all these above mentioned cases by simply interrupting the positive potential in this circuit requesting identification.

In this manner it is possible, for example, to release the identification circuit at any moment, as a result of a premature release of the call, or if, for example, a toll traffic operator wishes to have the identification restarted because a first effort in this direction had no success because of some faults in the equipment.

In the arrangements hitherto known wherein alternating current was used for marking the calling line, this was not possible.

III. The use of a direct current circuit for the identification makes it further possible to use this circuit at a later moment to connect up a by-path, so that the signalling of the number of the calling subscriber can take place along this by-path, as described above.

*Advantages of the method used for selecting an identification finder*

1. A characteristic alternating current potential is simultaneously connected to all finders IF of a group, but only when an identification circuit ICC wishes to select an idle circuit of this group by the selector switch BS.

2. This potential is different for each identification circuit, so that various of these circuits may simultaneously control the setting of their switch BS without mutual interference, because each switch BS can be independently stopped on a terminal at which a particular alternating current potential is present, being characteristic for the associated identification circuit ICC.

3. The identification circuit only connects the alternating current potential to one group of finders IF, and this group is determined by means of the starting circuit which was seized by the identification circuit and which serves the same group of 200 subscribers as the wanted group of finders IF. If viz. the alternating current potential is connected via wiper "CC*c*" of finder CC, this potential will be connected with the starting circuit initiating the identification process, as above mentioned, a starting circuit is connected to the line finders of the same two groups of 100 subscribers which are served by a group of identification finders IF, so that the starting circuit when extending the alternating current potential to the corresponding group of identification finders, causes this potential to be connected to the test conductor of the finders, serving the group of 200 subscribers, in which the calling line is connected.

*Advantages of the method used for holding the identification common circuit*

As has been set out above, the holding of the identification circuit ICC takes place under the control of the starting circuit until the latter with the aid of a junction finder IF has been successful in obtaining access to the metering wire of the calling subscriber's line, at which moment by connecting relay *Ppr* thereto, the functioning of the starting circuit is broken and the holding of the identification circuit ICC takes place under the control of relay *Ppr*, which now directly operates via the metering wire from the circuit requesting identification.

During the time that the finder IF is hunting for the calling line, the identification circuit ICC is held, therefore, from the starting circuit and by this circuit arrangement it is automatically ensured, that at any moment only one of the finders IF of a group can hunt for a calling line. That this is indeed correct is proved from the consideration that a starting circuit has been provided in common for the line finders of those two groups of hundred lines which may be served by one group of identification finders IF, and, since only one starting circuit is provided corresponding to each group of finders IF, and since this starting circuit can only hold one identification circuit at a time, this last mentioned circuit can cause only one finder IF to perform a hunting movement at a time. By this arrangement two or more finders IF cannot simultaneously test the metering wire of the subscriber's line circuit.

If this last result had not been obtained, a double test device would have to be provided, which would operate in known manner after the finders had stopped simultaneously on the calling line, which said device, in addition to two extra wipers (one for each 100 served lines) on the finder IF, would require a test wire per subscriber's line, the costs of which would be extremely high for this purpose.

It will be clear that as soon as relay *Ppr* has taken over the holding of the identification circuit and this has broken the operation of the starting circuit for the group under consideration, this starting circuit may immediately be operated for another case of identification in this same group of 200 subscriber's lines, with the result, that a second finder IF starts to perform a hunting action while the first one in connection with the first group is still being held.

This second finder cannot be stopped, however, on the first considered subscriber's line, since the positive potential at the metering wire thereof is so reduced that the testing device in the identification circuit which controls each setting of IF, cannot respond to it. The cause hereof is that this testing device comprises a static switch, which, in a similar way as that in the starting circuit, is connected with a positive potential of such value, that the rectifiers included in the static switch are only conductive if they are connected to a metering wire, at which the non-reduced positive potential is present.

*The provision of a voice frequency signal channel as by-path for the speech channel through a tandem exchange*

In order to explain a case of a tandem connection, a description will first be given of the method according to which calls to distant exchanges are identified via a single junction. This description will be made with reference to Figs. 1 to 3.

A. IDENTIFICATION VIA A SINGLE JUNCTION

The principles for the identification of calling subscribers which are connected in different exchanges is known and have been described for example, in the patent to William Hatton, No. 2,201,651, issued May 21, 1940. In so far as the principles have been applied to the circuit in accordance with the present invention they may be summarized as follows:

*a.* A circuit requesting identification in an exchange (Fig. 2) being distant from that with which the calling subscriber is connected (Fig. 1), connects a positive potential to the so-called "metering wire," which in the incoming selector, being connected with the two-wire junction, interconnecting both exchanges in question, via a small rectifier Ri', is connected to a common point, leading to a starting circuit SC' for identification via junctions. Furthermore, this "metering wire" is also connected in the terminal arcs of one or more finder circuits $IF_2$ for identification via junctions. In case of an identification call, the starting circuit hunts for an idle connecting circuit for identification via junctions (DCC). This circuit, mainly by means of its selector BS', establishes a connection to an idle finder circuit $IF_2$ in a group, giving access to the incoming junction. The identity of the originating exchange and also the number of the junction, are determined by the group of line finders $IF_2$ and the position in which one of these finders will be set, respectively, wherein each direction of incoming junctions is associated with a group of finders.

*b.* By means of its finder CS, the identification connecting circuit now obtains access to an idle junction $OGJ_2$ leading to the originating exchange. To this end use is made here of one of the ordinary junctions serving the subscriber's traffic in a direction opposite to that of the call for which the calling subscriber has to be identified. This outgoing junction may be directly accessible in the arc of the finder CS, or it may be reached via an extra selector stage (not shown), being connected in the arcs of CS. This extra selector stage also consists of ordinary selectors, which are used for subscriber's traffic in a direction, opposite to that of the call to be identified.

*c.* The identification connecting circuit takes care that, after access has been obtained to the junction circuit leading to the originating exchange, the connection of an incoming register (Fig. 1) to the incoming end is established at the exchange, to which the call to be identified belonged. This happens in known manner, whereafter the following codes are sent to this register:

1. A first code represents the number "11" and gives the indication to the incoming register that it has to deal with a case of identification. The incoming register then sets the incoming selector INC.GS to a group selector in a group, which is specially provided for identification, via junctions $II.GS_1$ and which may be reached via a separate terminal row of the incoming selector, which row, however, is not used for the regular subscriber's traffic.

2. Subsequently two digits are sent to indicate the junction group of which use is made on behalf of the call to be identified. By means of these two codes the incoming register at the originating exchange causes a selection to take place of a final selector for identification via junctions of a final selector for identification via junctions $FS_1$, wherein a group of these finder selectors is arranged in co-operation with each junction group. This final selector is reached by either one or two selections and is then either directly connected in the arcs of the identification group selectors II.$GS_1$, as set out above, or in the arcs of a second stage of similar group selectors III.$GS_1$.

This last fact depends upon the number of directions to be reached and also upon the total number of junctions leaving the exchange, which conditions together determine whether all final selectors can be reached via one selector stage or via two required selector stages.

3. Finally two codes are sent which correspond to the position of the identification finder $IF_2$ (Fig. 2) and which therefore indicate the number of the junction which was used for the call to be identified. Under the control of these two digits the final selector $FS_1$ is set to the outgoing end of this junction.

*d*. When the above-mentioned has been completed, it is clear that a new circuit has now been established from the incoming end of the junction dealing with the call to be identified to the outgoing end thereof, wherein this by-path from the incoming end of the junction may be followed, via a finder circuit $IF_2$ and the selector BS' of the identification connecting circuit DCC, and subsequently, via finder CS of this connecting circuit, either directly, or via a second group selector (not shown), to the outgoing end of a two-wire junction in the opposite direction, and from there, via this junction and the incoming selector INC.GS at the originating exchange, and via one or two stages of group selectors to the final selector $FS_1$ for identification, which is set to terminals corresponding to the outgoing end of the junction to be identified.

*e*. As soon as the outgoing end of the junction, which is used for the call to be identified, has been reached, a positive potential is applied to the metering wire leading to this outgoing junction circuit. This positive potential is supplied from the incoming register (Fig. 1) which is still connected, with the result that the identification starts at the originating exchange in the above-mentioned general way, i. e. this positive potential will actuate the starting circuit SC (Fig. 1).

*f*. As soon as the identification circuit ICC (Fig. 1), which was seized for identifying the calling subscriber's line at the originating exchange, has performed its function up to the point where it has set a finder IF to the terminal of the calling line and has determined the number of the calling line, this circuit will set its switch DS in the afore-described manner to the circuit requesting identification. In the present case the circuit requesting identification is the final selector $FS_1$ and this circuit is connected in the arcs of switch DS of the identification circuits. Switch DS is therefore set to these terminals and subsequently establishes a direct connection between the identification circuit ICC and the final selector $FS_1$. The direct ground supplied to the metering wire in order to effect the switching-over of the positive potential, is now transferred to the incoming register (Fig. 1) which upon reception thereof, disconnects itself.

*g*. The fact that switch DS (Fig. 1) has set itself to the final selector for identification via junctions causes a signal to be sent to the identification circuit in order to notify it of the fact that it has to deal with a case of distant identification. Subsequently it will send out the numerical digits of the calling subscriber's line in the form of voice frequency impulses via the "*a*" and "*b*" wipers of switch DS, namely in a manner as has been already described above. These voice frequency signals are now passed through the final selector $FS_1$ and through the different group selectors through which the final selector is connected to the incoming junction, which is seized on behalf of the identification, as well as through this junction itself, via which the voice frequency signals are now transmitted to the distant exchange (Fig. 2). At this exchange they are passed either directly or via an intermediate group selector to the connecting circuit for identification DCC where they are received by a voice frequency signal receiver converting the signals in question into direct current impulses.

*h*. Meanwhile, the connecting circuit for identification DCC has built up a by-path by means of a switch DS to the circuit requesting identification in a manner which is completely identical to that outlined above for the case of the identification circuit ICC. The alternating current impulses received in the connecting circuit DCC are therefore converted into direct current impulses and are directly transmitted from this connecting circuit, via switch DS to the circuit requesting identification.

B. IDENTIFICATION VIA MORE THAN ONE JUNCTION IN TANDEM

The case should not be considered that a call was made from the originating exchange (Fig. 1), via a tandem exchange (Fig. 2), to a subscriber which is connected to the terminal exchange (Fig. 3). In this case the identification takes place as follows:

(*a*) Identification starts by the intermediance of a circuit which at the final exchange (Fig. 3) requests identification and, in the manner above-described, the connection is established from a connecting circuit for identification DCC' (Fig. 3) to the incoming junction INC.GS''' which terminates at the terminating exchange. In the above-described manner this connecting circuit determines the group of junctions as well as the number of the incoming junction at the terminating exchange, which was seized for the call to be identified, and then starts by seizing a junction leading to the tandem exchange. At this tandem exchange an incoming register INC.GS' (Fig. 2) is seized and by means of codes, received from the connecting circuit DCC' at the terminal exchange (Fig. 3), a by-path is then set to the outgoing end of the junction $OGJ_3$ between the tandem exchange and the terminating exchange, concerned with this call.

(*b*) As soon as the incoming register and the tandem exchange has obtained access to the outgoing end of the junction leading to the terminating exchange, this register applies a positive potential on to the metering wire leading to this outgoing end in the above-described manner, while furthermore this positive potential is now transmitted to the incoming end of the junction from the originating exchange to the tandem exchange which was seized for the call to be identified. In consequence of this fact, at the tandem exchange (Fig. 2) a connecting circuit for identification DCC is connected to this incoming junction, the working of this connecting circuit being similar to that illustrated above, so that now, under the control thereof, a by-path will be established, via a two wire junction leading to the originating exchange and from there to the outgoing end of the junction from the originating exchange to the tandem exchange which was seized for the call to be identified. As soon as this has happened, the identification starts at the originating exchange in the described manner.

(c) Meanwhile the connecting circuit for identification at the tandem exchange (Fig. 2) will now build up a by-path by means of its switch DS' to the circuit requesting identification, which circuit in this case is the final selector $FS_1'$ (Fig. 2) which was seized at the tandem exchange. In this manner this connecting circuit establishes a signal channel which is completely separate, but is parallel to the conversational path, via both junctions from the originating exchange to the terminating exchange. This signal channel extends from selector $FS_1$ at the originating exchange (Fig. 1) through one or two selectors $II.GS_1$ and $III.GS_1$, the incoming selector INC.GS, and subsequently, via the junction seized for identification purposes from the originating exchange to the tandem exchange, selector CS of the identification connecting circuit DCC (Fig. 2), the transmission bridge (not shown) in this circuit, switch DS', to the circuit $FS_1'$ (Fig. 2) at the tandem exchange, and further, via the identification selector $II.GS_1$ (eventually $III.GS_1$) and the selector INC.GS'' at the tandem exchange, the junction seized for the identification between the tandem and terminating exchanges, the selector CS' of the identification connecting circuit DCC' at the terminating exchange (Fig. 3), the transmission bridge (not shown) therein and finally, via switch DS''' to the circuit which requested identification, e. g. FIM'' (Fig. 3).

(d) As soon as the identification circuit at the originating exchange has completed the identification of the calling line, it will, responding to the fact that its switch DS has been set into a position indicating a case of distant identification, cause the transmission of the calling subscriber's number by means of voice frequency impulses. These voice frequency impulses are now transmitted via the junction which was temporarily seized for identification and leads between the originating exchange to the tandem exchange and via the signal channel at the tandem exchange, as mentioned under "c," to the junction which was temporarily seized for identification between the tandem exchange and the terminating exchange, where, in the manner as described under "g" and in "h" (Identification via a Single Junction), it is extended to the connecting circuit DCC' and thereafter is converted into direct current impulses and is finally transmitted to the circuit requesting identification, via switch DS'''.

From this it will be evident that a complete signal channel, which, however, entirely differs from the conversational channel, has been built up from the identification circuit at the originating exchange to the connecting circuit for identification at the terminating exchange, viz. the tandem exchange, through which the voice frequency impulses received from the originating exchange are directly sent to the terminating exchange.

(e) It may be noted that the connecting circuit DCC for identification at the tandem exchange is used in the condition in which it directly transmits the voice frequency impulses via one junction to another junction as a result of the fact that the position of its switch DS' provides the indication that the identification was requested from a distant exchange. The voice frequency receiver forming part of this connecting circuit is therefore not connected each time the connecting circuit at a tandem exchange is connected, which indeed is the case if switch DS' of the connecting circuit has been set in a position, indicating that the circuit requesting identification is located at the exchange as has been outlined above under "h" (Identification via a Single Junction).

(f) It is clear that the by-path for identification providing a complete two wire signal channel which is separate from the ordinary conversation channel, may be established via more than one tandem exchange if this is necessary, in which case a call has to be established via more than one tandem exchange. In this case the operation as described above for a tandem exchange is repeated in each exchange concerned in this connection.

The invention is not restricted to the above described embodiments.

Instead of using a positive direct current potential as characteristic potential for identification a negative direct current potential may be equally utilized, wherein however the total resistance must have such value that a potential will result at the metering wire which does not operate the service meter but exclusively operates the equipment in the starting circuit and the identification circuit. The equipments in question must be designed in such a manner that they exclusively respond to the negative resulting direct current potential of a predetermined value and do not respond to a higher potential.

Satisfying this requirement has proved practicable from different circuit arrangements, which have already been applied.

In addition to the use of an alternating circuit potential with phase discriminating as multipotentials for setting switches and reading the position of the identification finder and such like, use may be equally made of other well-known circuit arrangements in which multi-marking is applied e. g. with alternating current of different frequency or direct current potentials of different value.

In other parts of the circuit arrangement modifications are also possible within the scope of the invention, such as the way in which the digits of the calling number of the line to be identified are determined.

The shown circuit arrangement therefor does not possess any limitative character.

What is claimed:

1. An automatic telephone system for establishing connections in which identifications of a calling line may be effected at any one of a plurality of different points in the system, comprising a plurality of lines to be identified each line having a conductor, a plurality of request circuits each of which may request identification of a calling line, a plurality of identification circuits, said identification circuits being common both to all said lines and to all said identification-request circuits, switching means for connecting a calling line to one of said request circuits, a source of direct current potential at each request circuit, said sources being of substantially the same predetermined value, means at each request circuit for initiating the request for identification of a calling line connected to it, means for connecting said source of potential to the conductor of said calling line when said request-initiating means is operated, means operated by said request-initiating means for seizing a free identification circuit and connecting it to the request circuit associated with said request-initiating means, switching means connected to said seized identification circuit and selectively connectable to the conductors of said lines, and means responsive to the connection of said source of potential to the conductor of said calling line for causing said last-mentioned switching means to hunt for the line whose conductor has been connected to said source of potential.

2. A system, as claimed in claim 1, in which another equipment is provided at each line connected to the conductor of the line and in which the direct current potential has such a value that the resulting voltage at said conductor is insufficient to operate said other equipment connected thereto, said other equipment being responsive to other signals, while said identification circuit connected thereto is adjusted so that it operates at this resulting voltage.

3. System, as claimed in claim 1, in which the identification circuit seizing and connecting means comprises a starting circuit and including a rectifier, means for normally maintaining a direct current potential on a portion of said starting circuit, means responsive to the operation of the request-initiating means for applying the direct current potential from the source to said starting circuit through said rectifier, said rectifier being so poled that current will only flow when the potential from said source is greater that that normally maintained on said starting circuit, switching means for selectively connecting said starting circuit with one of said common identification circuits, and means controlled by the flow of current from said source for causing the starting circuit to hunt over said switching means for an idle of said common identification circuits and to seize and hold said circuit during the time that said identification circuit hunts for the marked conductor of the calling line.

4. System, as claimed in claim 3, in which a starting circuit is provided for each group of lines for which identification circuits are provided, and in which the switching means connected to an identification circuit and selectively connectable to the conductors comprises a selector connected to each identification circuit and a plurality of identification finders selectively connectable to said selector, means for causing a characterizing alternating current potential to be applied to the test conductors of all idle finders in the wanted group, means acting through the identification circuit and responsive to said alternating current potential for causing said selector, under control of the starting circuit, to select and seize an idle identification finder in that group to which the line to be hunted is connected, means for causing said selected finder to hunt for the calling line and stop thereon, and means determined by the position of said finder for storing information relating to the calling line in said identification circuit.

5. System, as claimed in claim 4, further comprising means for sending first signals to the identification circuit from a starting circuit depending on the numerical grouping of a plurality of lines with respect to said starter circuit, means for sending second signals to the circuit requiring the identification derived from the position taken by the identification finder, and means for sending additional signals to said circuit derived from a combination of data obtained from said starting circuit and the identification finder.

6. System, as claimed in claim 1, further comprising a rectifier in the means for connecting the free identification circuit to the request circuit, a relay in the identification circuit, means operative after the hunting of the conductor by the identification circuit for connecting ground to said conductor via the winding of said relay, whereby said relay operates and the potential at said conductor is so lowered that the means for causing the identification circuit to hunt ceases to function because the potential at the conductor is reduced to a value at which the rectifier is no longer conductive, and means under control of said relay for holding the identification circuit under the control of the direct current potential.

7. System, as claimed in claim 1, in which means is provided for utilizing the switching means which connects a calling line to an identification-request circuit for setting up the means for connecting said identification circuit to said identification-request circuit to form a by-path under the control of the identification circuit, and means for applying, via said switching means and from the identification circuit, a characteristic potential to the identification-request circuit, which potential characterizes said circuit for setting the by-path.

8. System, as claimed in claim 7, in which a finder switch is included in the by-path, this switch having its wipers connected with the identification circuit and its bank terminals connected to the identification-request circuits, whereby the by-path is set by extending the physical circuit via a wiper and arc terminal of said finder switch back to the identification circuit, and means for driving said finder switch until it reaches the wanted position under the control of the identification circuit.

9. System, according to claim 8, in which means under control of the identification circuit is provided for operating the switching means for breaking the physical circuit between the circuit and the identification conductor of the calling line as soon as the by-path has been established and for closing a circuit via one of the conductors of the by-path for holding the identification circuit directly from the identification-request circuit to the identification circuit.

10. A system, as claimed in claim 9, in which means is provided responsive to the position of the finder switch in the by-path for providing an indication to the identification circuit with respect to a characteristic of the identification-request circuit.

11. Automatic telephone system for establishing connections in which the identification of a calling line may be effected by connecting a potential to one of the conductors of the line to be identified, comprising a plurality of lines to be identified, each line having a conductor, a plurality of circuits each of which may request identification of a calling line, a plurality of identification circuits, said identification circuits being common both to all said lines to be identified and to all said identification-request circuits, a source of direct current potential at each identification-request circuit, said sources being substantially of the same value, switching means for connecting the conductor of a calling line with a selected identification-request circuit, means at each request circuit for initiating the request for identification of a calling line connected to it, means including a physical circuit and controlled by the operation of said initiating means for connecting the associated source of potential to the conductor of said calling line to be identified, means operated by said initiating means for seizing a free identification circuit, switching means for selectively connecting said identification circuits to the conductors of said lines, means responsive to the connection of said source of potential to said conductor for causing said seized identification circuit to hunt for said potential on said last-mentioned switching means and for stopping the hunting action when said potential is found, whereby said identification circuit is connected to said conductor, additional conductors connected to each identification-request circuit, means controlled by said seized identification circuit for utilizing said physical circuit for selectively connecting said identification circuit to the conductors of said identification-request circuit to form a by-path connection, said means including means controlled by said identification circuit for connecting a characteristic potential to one of said conductors over said physical circuit and a finder switch included in said by-path, said finder switch having its wipers connected with said identification circuit and its bank terminals connected to the additional conductors of said identification-request circuits, means responsive to said characteristic-potential-connecting means for driving said finder switch until the wipers of said finder switch reach the conductor to which said characteristic potential is connected, means for disconnecting said driving means when said characteristic potential is reached, means for signalling the nature of the identification-request circuit to said identification-circuit over one or more conductors of said by-path connection, and means at said identification-circuit responsive to the operation of said last-mentioned means for signalling the number of the calling line to said identification-request circuit.

12. System, as claimed in claim 11, in which the identification-request circuit is at a local point and the means for signalling the number of the calling line uses direct current impulses.

13. System, as claimed in claim 11, in which the identification-request circuit is at a distant point and the means for signalling the number of the calling line uses voice frequency impulses via the by path.

14. System, according to claim 11, in which the number of transmitted digits for calls in the local network corresponds to the number of digits of the subscriber's number only, and the number of transmitted digits for calls to other networks is the same preceded by a number of digits corresponding to the prefixes of the network.

15. System, according to claim 11, in which there are a plurality of exchanges and one or more junctions are provided in the built-up connection between the originating exchange and the identification-request circuit, said junctions having incoming end conductors, and further comprising means for starting the identification when the marking potential is applied to one of the conductors of the incoming end of the junction circuit and makes an identification circuit operative, means under control of said identification circuit for establishing a by-path to the preceding exchange in the connection via another junction, means for transmitting the number of the calling line over said last-mentioned by-path from the originating exchange in the form of voice frequency impulses, and means controlled by the position of the finder switch for causing the finder switch, associated with said identification circuit and hunting for the identification-request circuit which has requested the identification, to cause the identification circuit to convert voice frequency impulses into direct current impulses, if the identification is requested locally, or, in case of a tandem connection, to transmit voice frequency impulses unaltered via a subsequent by-path.

16. An automatic telephone system for establishing connections between calling and called lines and in which the identification of a calling line may be effected by connecting a potential to one of the conductors of the line circuit to be identified, comprising a plurality of lines to be identified each line having a conductor, a plurality of circuits each of which may request identification of a calling line, a plurality of identification circuits, said identification circuits being common both to all said lines to be identified and to all said identification-request circuits, a source of direct current potential at each identification-request circuit, said sources having substantially the same predetermined value, means for connecting the conductor of a calling line with a selected identification-request circuit, means at each request circuit for initiating the request for identification of a calling line connected to it, means including a physical circuit and controlled by the operation of said initiating means for connecting the associated source of potential to the conductor of said calling line to be identified, means operated by said initiating means for seizing a free identification circuit, a selector switch in each identification-circuit having its wipers connected to said identification-circuit, means in said seized identification-circuit operated by said seizing means for setting said selector switch to identify the thousands digit of the calling number, means connected to the terminals of said selector switch and controlled by the setting of said switch for storing said thousands digit, a plurality of line finders available to each identification circuit, at least one of said finders having said conductor connected in its terminal bank, means controlled by the seizure of said identification circuit for causing said seized identification circuit to hunt for and find a finder having said conductor connected in its terminal bank, means controlled by said seized line finder for registering and storing the hundreds digit of said calling number in said identification circuit, means controlled by said identification circuit and operative after said hundreds digit has been stored for causing said line finder to hunt for said conductor having said direct current potential and to stop thereon, means operative thereafter and dependent upon the position of said finder for setting said selector switch to identify the tens digits of said calling number, means controlled by the setting of said switch for storing said tens digit, means controlled by the setting of said line finder for thereafter setting said selector switch to identify the units digit of said calling number, means controlled by the setting of said switch for storing said units digit in said identification circuit, a by-path connection between said conductor and a terminal of said selector switch, means in said identification circuit for thereafter setting said selector on said by-path terminal, an indicator in each identification-request circuit, connections from said selector switch to said indicator when said switch is on said by-path terminal, and means for setting said indicator over said connections in accordance with the thousands, hundreds, tens and units digits stored in said identification circuit.

17. An automatic telephone system, according to claim 16, in which the means for seizing an identification circuit comprises a starting circuit serving a group of lines to be identified and connected to the physical conductors thereof, means in said starting circuit responsive to the connection of the potential source for seizing and holding the identification circuit, and in which each identification circuit comprises means for transferring the holding of the identification circuit from the starting circuit over the by-path to the circuit requesting the identification and for releasing said starting circuit after the line finder has been found and seized.

18. An automatic telephone system comprising a plurality of lines, means for establishing connections from a calling line to a called line, a plurality of identification circuits, a plurality of circuits each of which may request identification of a calling line, means connected to and operated by each identification-request circuit for seizing and holding an identification circuit and setting up a first connection between said identification circuit and said calling line, means in said seized identification circuit for setting up a second connection to the calling line, means determined by the calling line over said first connection for registering and storing the thousands digit of said calling line in said identification circuit, means determined partly by said calling line over said first connection and partly by a portion of said second connection for registering and storing the hundreds digit of said calling line in said identification circuit, means determined by said calling line over said second connection for thereafter successively registering and storing the tens and units digits of said calling line, an indicator, and means for transferring the digits stored in said identification circuit to said indicator.

References Cited in the file of this patent

UNITED STATES PATENTS

| Number | Name | Date |
|---|---|---|
| 2,604,540 | Blake | July 22, 1952 |
| 2,535,512 | Ostline | Dec. 26, 1950 |